US009277534B2

(12) United States Patent  (10) Patent No.: US 9,277,534 B2
Yun et al.  (45) Date of Patent: Mar. 1, 2016

(54) WIRELESS COMMUNICATIONS SYSTEMS USING MULTIPLE RADIOS

(71) Applicant: HMICRO, INC., Los Altos, CA (US)

(72) Inventors: Louis C. Yun, Los Altos, CA (US); Ali Niknejad, Berkeley, CA (US); Venkateswara Rao Sattiraju, Union City, CA (US); James C. Beck, Berkeley, CA (US); Surendar Magar, Dublin, CA (US)

(73) Assignee: HMICRO, INC., Fremont, CA (US)

( * ) Notice: Subject to any disclaimer, the term of this patent is extended or adjusted under 35 U.S.C. 154(b) by 0 days.

(21) Appl. No.: 14/531,977

(22) Filed: Nov. 3, 2014

(65) Prior Publication Data
US 2015/0156749 A1 Jun. 4, 2015

Related U.S. Application Data

(63) Continuation of application No. 12/866,189, filed as application No. PCT/US2009/033490 on Feb. 6, 2009, now Pat. No. 8,879,983.

(60) Provisional application No. 61/026,710, filed on Feb. 6, 2008, provisional application No. 61/114,418,
(Continued)

(51) Int. Cl.
*H04W 24/00* (2009.01)
*H04W 72/02* (2009.01)
*H04W 72/08* (2009.01)
(Continued)

(52) U.S. Cl.
CPC .......... *H04W 72/02* (2013.01); *H04W 52/0238* (2013.01); *H04W 72/06* (2013.01); *H04W 72/082* (2013.01); *H04W 72/085* (2013.01);
(Continued)

(58) Field of Classification Search
USPC ........................................... 455/513
See application file for complete search history.

(56) References Cited

U.S. PATENT DOCUMENTS 4,124,817 A * 11/1978 Takahashi ............ H04B 1/1638
455/205
4,412,340 A * 10/1983 Bartlett ................ G06G 7/1928
375/343
(Continued)

FOREIGN PATENT DOCUMENTS

EP 0716554 A2 6/1996
EP 0716554 A3 8/1999
(Continued)

OTHER PUBLICATIONS

Aoki, et al. Fully Integrated CMOS Power Amplifier Design Using the Distributed Active-Transformer Architecture. IEEE Journal of Solid-State Circuits, Mar. 2002; 37(3):371-383.
(Continued)

*Primary Examiner* — Hai V Nguyen
(74) *Attorney, Agent, or Firm* — Wilson Sonsini Goodrich & Rosati

(57) ABSTRACT

The present invention relates to a communication system and methods of use thereof. The system includes sets of complementary radios for transmitting and receiving signals to achieve high reliability and reduced costs. The sets of complementary radios are in wireless communication with each other. A new connection is made by selecting from amongst the complementary radios. Switching between complementary radios during a connection is also permitted. Optimized protocols and hardware for implementing the system are disclosed.

20 Claims, 22 Drawing Sheets

Related U.S. Application Data filed on Nov. 13, 2008, provisional application No. 61/114,449, filed on Nov. 13, 2008, provisional application No. 61/114,431, filed on Nov. 13, 2008, provisional application No. 61/114,427, filed on Nov. 13, 2008.

(51) Int. Cl.
*H04W 52/02* (2009.01)
*H04W 72/06* (2009.01)
*H04W 28/04* (2009.01)
*H04W 72/04* (2009.01)
*H04W 88/06* (2009.01)

(52) U.S. Cl.
CPC ............ *H04W 28/04* (2013.01); *H04W 72/0453* (2013.01); *H04W 88/06* (2013.01)

(56) References Cited

U.S. PATENT DOCUMENTS

| | | | |
|---|---|---|---|
| 5,325,204 A * | 6/1994 | Scarpa | H04N 5/21 348/469 |
| 5,511,553 A * | 4/1996 | Segalowitz | A61B 5/0006 128/903 |
| 5,668,837 A * | 9/1997 | Dent | H03G 5/24 375/316 |
| 5,852,630 A * | 12/1998 | Langberg | H04L 27/2647 375/219 |
| 5,917,865 A | 6/1999 | Kopmeiners et al. | |
| 6,016,316 A | 1/2000 | Moura et al. | |
| 6,091,715 A * | 7/2000 | Vucetic | H04B 1/406 370/277 |
| 6,185,201 B1 * | 2/2001 | Kiyanagi | H04B 1/40 370/343 |
| 6,192,239 B1 * | 2/2001 | Lee | H04Q 36/14 455/421 |
| 6,275,484 B1 | 8/2001 | Lynch et al. | |
| 6,295,461 B1 * | 9/2001 | Palmer | H04B 1/69 455/403 |
| 6,351,652 B1 * | 2/2002 | Finn | H04B 1/7163 455/462 |
| 6,407,837 B1 * | 6/2002 | Spickermann | H04J 14/0298 398/163 |
| 6,416,471 B1 * | 7/2002 | Kumar et al. | G06F 19/323 128/903 |
| 6,448,938 B1 | 9/2002 | Chiang et al. | |
| 6,454,708 B1 * | 9/2002 | Ferguson | A61B 5/02055 128/903 |
| 6,498,927 B2 | 12/2002 | Kang et al. | |
| 6,574,459 B1 | 6/2003 | Kaminski et al. | |
| 6,625,202 B1 | 9/2003 | Sudo et al. | |
| 6,625,433 B1 | 9/2003 | Poirier et al. | |
| 6,643,522 B1 * | 11/2003 | Young | H04B 1/406 455/41.2 |
| 6,694,150 B1 * | 2/2004 | Standke | G01S 19/36 342/357.76 |
| 6,694,180 B1 * | 2/2004 | Boesen | A61B 7/04 600/547 |
| 6,725,058 B2 * | 4/2004 | Rinne | H04W 36/30 370/331 |
| 6,728,517 B2 * | 4/2004 | Sugar | H04B 1/005 455/272 |
| 6,741,847 B1 * | 5/2004 | Claxton | H03D 7/163 455/207 |
| 6,784,831 B1 | 8/2004 | Wang et al. | |
| 6,853,835 B2 | 2/2005 | Wynbeek | |
| 6,952,594 B2 * | 10/2005 | Hendin | H04B 1/005 455/302 |
| 7,024,169 B2 | 4/2006 | Ciccarelli et al. | |
| 7,068,987 B2 | 6/2006 | Baldwin et al. | |
| 7,089,033 B2 * | 8/2006 | Leinonen | H04B 1/005 375/219 |
| 7,136,009 B1 * | 11/2006 | Tsui | G01S 7/021 342/13 |
| 7,171,161 B2 * | 1/2007 | Miller | H04L 27/0012 375/340 |
| 7,174,138 B2 | 2/2007 | Webster et al. | |
| 7,174,190 B2 | 2/2007 | Walker et al. | |
| 7,194,244 B2 | 3/2007 | Akamine et al. | |
| 7,254,191 B2 * | 8/2007 | Sugar | H04L 1/1664 375/224 |
| 7,266,361 B2 * | 9/2007 | Burdett | H04B 1/30 455/323 |
| 7,269,151 B2 * | 9/2007 | Diener | H04L 1/1664 370/329 |
| 7,294,105 B1 * | 11/2007 | Islam | A61B 5/0006 128/903 |
| 7,305,052 B2 * | 12/2007 | Spiridon | H04B 1/719 375/147 |
| 7,313,374 B2 | 12/2007 | Lewis et al. | |
| 7,315,564 B2 * | 1/2008 | McCorkle | H04M 3/42034 375/130 |
| 7,324,794 B2 | 1/2008 | Chari et al. | |
| 7,340,010 B2 | 3/2008 | Kroeger | |
| 7,349,503 B2 | 3/2008 | Husted et al. | |
| 7,349,709 B2 | 3/2008 | Hanusch et al. | |
| 7,362,212 B2 * | 4/2008 | Burghard | G06K 7/0008 340/10.1 |
| 7,397,872 B2 | 7/2008 | Komori et al. | |
| 7,440,491 B2 * | 10/2008 | Balakrishnan | H04B 1/71635 341/122 |
| 7,444,127 B2 * | 10/2008 | Laroia | H04B 1/005 370/335 |
| 7,512,395 B2 * | 3/2009 | Beukema | H03D 1/229 33/307 |
| 7,522,885 B2 | 4/2009 | Parssinen et al. | |
| 7,525,493 B2 | 4/2009 | Iwai et al. | |
| 7,526,052 B2 * | 4/2009 | Davidoff | H03H 17/0294 329/315 |
| 7,627,291 B1 * | 12/2009 | James-Roxby | H01Q 1/44 375/324 |
| 7,643,811 B2 * | 1/2010 | Reunamaki | H04B 1/005 455/132 |
| 7,652,979 B2 * | 1/2010 | Arslan | H04B 1/719 370/208 |
| 7,653,369 B2 | 1/2010 | Simmons et al. | |
| 7,680,201 B2 | 3/2010 | Kroeger | |
| 7,689,188 B2 * | 3/2010 | Rofougaran | H04B 1/18 455/193.1 |
| 7,702,046 B2 | 4/2010 | Murthy et al. | |
| 7,706,468 B2 | 4/2010 | Kroeger | |
| 7,711,368 B2 * | 5/2010 | Feher | H04M 11/04 370/335 |
| 7,747,338 B2 * | 6/2010 | Korhonen | H04M 1/7253 455/3.06 |
| 7,796,955 B2 * | 9/2010 | Gau | H04B 1/48 343/702 |
| 7,840,199 B2 * | 11/2010 | Krishnaswamy | H01Q 3/26 327/105 |
| 7,873,120 B2 | 1/2011 | Kroeger | |
| 7,957,495 B2 * | 6/2011 | Wu | H04B 1/7102 375/346 |
| 7,962,148 B2 * | 6/2011 | Stamoulis | H04W 48/18 370/329 |
| 7,969,307 B2 * | 6/2011 | Peeters | A61B 5/0002 340/572.1 |
| 7,979,049 B2 * | 7/2011 | Oredsson | H04W 52/0225 455/213 |
| 7,986,652 B1 * | 7/2011 | Hui | H04W 52/0261 370/311 |
| 7,986,739 B2 * | 7/2011 | Aytur | H04L 5/0062 370/335 |
| 8,036,159 B2 * | 10/2011 | Berens | H04B 1/719 370/328 |
| 8,126,030 B2 * | 2/2012 | Klomsdorf | H04B 1/1027 375/141 |
| 8,134,949 B2 * | 3/2012 | Ruuska | H04L 12/66 370/328 |
| 8,149,894 B2 * | 4/2012 | Fudge | H04B 1/7136 375/133 |
| 8,160,498 B2 * | 4/2012 | Rofougaran | H04B 7/04 455/41.2 |

(56) References Cited

U.S. PATENT DOCUMENTS

| | | | | |
|---|---|---|---|---|
| 8,233,935 | B2* | 7/2012 | Rofougaran | H04B 1/005 455/552.1 |
| 8,238,285 | B2* | 8/2012 | Rofougaran | H03F 1/0222 370/321 |
| 8,249,616 | B2 | 8/2012 | Boejer et al. | |
| 8,254,986 | B2 | 8/2012 | Russell | |
| 8,315,238 | B2* | 11/2012 | Taleb | H04L 1/0041 370/338 |
| 8,331,425 | B2* | 12/2012 | Nicolas | H04B 7/022 375/219 |
| 8,331,898 | B2 | 12/2012 | Waters et al. | |
| 8,345,808 | B2* | 1/2013 | Ye | H04B 1/719 375/130 |
| 8,369,467 | B2* | 2/2013 | Kajakine | H03G 3/3068 330/129 |
| 8,379,549 | B2* | 2/2013 | Oppelt | G01R 33/341 370/297 |
| 8,463,189 | B2 | 6/2013 | Bashir et al. | |
| 8,472,868 | B2 | 6/2013 | Mu et al. | |
| 8,583,197 | B2* | 11/2013 | Rofougaran | H01Q 5/00 370/329 |
| 8,611,319 | B2* | 12/2013 | Magar | A61B 5/0002 340/539.12 |
| 8,631,483 | B2 | 1/2014 | Soni et al. | |
| 8,855,093 | B2* | 10/2014 | Rofougaran | G06F 15/163 370/338 |
| 8,879,983 | B2* | 11/2014 | Yun | H04W 72/085 455/307 |
| 9,019,934 | B2* | 4/2015 | Yun | H04W 88/06 370/331 |
| 2001/0050987 | A1* | 12/2001 | Yeap | G10L 21/0208 379/399.01 |
| 2002/0013133 | A1 | 1/2002 | Lam | |
| 2002/0071508 | A1* | 6/2002 | Takada | H04B 1/71 375/346 |
| 2002/0142796 | A1* | 10/2002 | Sutton | H04B 1/48 455/553.1 |
| 2003/0027538 | A1 | 2/2003 | Masumoto et al. | |
| 2003/0087622 | A1* | 5/2003 | Jayaraman | H04B 1/1036 455/307 |
| 2003/0182040 | A1* | 9/2003 | Davidson | A41D 13/018 701/45 |
| 2003/0198200 | A1* | 10/2003 | Diener | H04L 1/1664 370/329 |
| 2003/0219035 | A1* | 11/2003 | Schmidt | H01Q 1/241 370/478 |
| 2003/0224741 | A1* | 12/2003 | Sugar | H04W 16/14 455/115.1 |
| 2003/0236089 | A1* | 12/2003 | Beyme | H04B 17/0087 455/423 |
| 2004/0010207 | A1* | 1/2004 | Flaherty | A61B 5/14532 600/573 |
| 2004/0028123 | A1* | 2/2004 | Sugar | H04L 1/1664 375/224 |
| 2004/0087294 | A1 | 5/2004 | Wang | |
| 2004/0137857 | A1 | 7/2004 | Seo | |
| 2004/0146092 | A1* | 7/2004 | Balakrishnan | H04B 1/71635 375/147 |
| 2004/0156440 | A1* | 8/2004 | Sugar | H04W 16/14 375/259 |
| 2004/0162035 | A1* | 8/2004 | Petersen | A61B 5/02055 455/90.1 |
| 2004/0199056 | A1* | 10/2004 | Husemann | A61B 5/0002 600/300 |
| 2004/0219885 | A1* | 11/2004 | Sugar | H04B 17/309 455/67.11 |
| 2004/0242174 | A1 | 12/2004 | Kim et al. | |
| 2005/0032497 | A1 | 2/2005 | Girardeau, Jr. et al. | |
| 2005/0163096 | A1 | 7/2005 | Momona | |
| 2005/0163256 | A1 | 7/2005 | Kroeger | |
| 2005/0206518 | A1* | 9/2005 | Welch | A61B 5/0024 340/539.12 |
| 2005/0233716 | A1* | 10/2005 | Laroia | H04B 1/005 455/133 |
| 2005/0250468 | A1 | 11/2005 | Lu et al. | |
| 2005/0255878 | A1 | 11/2005 | Leinonen et al. | |
| 2006/0030903 | A1* | 2/2006 | Seeberger | A61N 1/37223 607/60 |
| 2006/0045113 | A1* | 3/2006 | Palisca | H04W 48/18 370/431 |
| 2006/0122474 | A1* | 6/2006 | Teller | A61B 5/0022 600/300 |
| 2006/0133551 | A1* | 6/2006 | Davidoff | H03H 17/0294 375/350 |
| 2006/0146917 | A1* | 7/2006 | Ishida | H04B 1/406 375/141 |
| 2006/0147492 | A1* | 7/2006 | Hunter | A61B 17/11 424/426 |
| 2006/0166681 | A1* | 7/2006 | Lohbihler | G01S 5/02 455/456.2 |
| 2006/0264767 | A1* | 11/2006 | Shennib | A61B 5/0006 600/509 |
| 2006/0285582 | A1 | 12/2006 | Sumasu et al. | |
| 2007/0002961 | A1* | 1/2007 | Hoctor | H04B 7/0857 375/267 |
| 2007/0004355 | A1* | 1/2007 | Kipnis | H03D 3/008 455/190.1 |
| 2007/0019672 | A1* | 1/2007 | Guthrie | H04W 88/06 370/466 |
| 2007/0027367 | A1* | 2/2007 | Oliver | A61B 5/0002 600/300 |
| 2007/0027388 | A1* | 2/2007 | Chou | A61B 5/0002 600/393 |
| 2007/0030116 | A1* | 2/2007 | Feher | H04M 3/382 340/5.53 |
| 2007/0053410 | A1* | 3/2007 | Mahonen | H04B 1/71637 375/130 |
| 2007/0053412 | A1* | 3/2007 | Hashimoto | H04B 1/7163 375/130 |
| 2007/0076649 | A1* | 4/2007 | Lin | H04W 76/025 370/328 |
| 2007/0081505 | A1* | 4/2007 | Roberts | H04B 1/7163 370/338 |
| 2007/0110053 | A1 | 5/2007 | Soni et al. | |
| 2007/0129034 | A1 | 6/2007 | Adams et al. | |
| 2007/0147236 | A1* | 6/2007 | Lee | H04B 1/719 370/229 |
| 2007/0159321 | A1* | 7/2007 | Ogata | A61B 5/0002 340/539.12 |
| 2007/0177570 | A1* | 8/2007 | Kwon | H04W 92/02 370/349 |
| 2007/0183547 | A1* | 8/2007 | Fifield | H04B 1/123 375/349 |
| 2007/0208262 | A1* | 9/2007 | Kovacs | A61B 5/0404 600/509 |
| 2007/0218870 | A1* | 9/2007 | Satoh | G01S 3/72 455/404.2 |
| 2007/0242730 | A1* | 10/2007 | Birru | H04B 1/71637 375/130 |
| 2007/0244383 | A1* | 10/2007 | Talbot | A61B 5/0002 600/365 |
| 2007/0279217 | A1* | 12/2007 | Venkatraman | A61B 5/0022 340/539.12 |
| 2007/0290930 | A1 | 12/2007 | Krishnaswamy et al. | |
| 2008/0001735 | A1* | 1/2008 | Tran | G06F 19/3418 340/539.22 |
| 2008/0043888 | A1* | 2/2008 | Bhukania | H04L 27/2647 375/346 |
| 2008/0139894 | A1* | 6/2008 | Szydlo-Moore | A61B 5/0002 600/300 |
| 2008/0165894 | A1 | 7/2008 | Kroeger | |
| 2008/0175331 | A1 | 7/2008 | Kroeger | |
| 2008/0200120 | A1* | 8/2008 | Ruuska | H04W 48/08 455/41.2 |
| 2008/0294020 | A1* | 11/2008 | Sapounas | A61B 5/0024 600/301 |
| 2008/0317098 | A1* | 12/2008 | Juntunen | H04B 7/10 375/130 |
| 2009/0037670 | A1* | 2/2009 | Rofougaran | G06F 13/385 711/154 |
| 2009/0040107 | A1 | 2/2009 | Yun et al. | |
| 2009/0042527 | A1 | 2/2009 | Niknejad | |
| 2009/0051544 | A1* | 2/2009 | Niknejad | G06F 3/011 340/573.1 |

(56) References Cited

U.S. PATENT DOCUMENTS

| | | | |
|---|---|---|---|
| 2009/0054075 A1 | 2/2009 | Boejer et al. | |
| 2009/0054737 A1* | 2/2009 | Magar | H04L 67/04 600/300 |
| 2009/0075613 A1* | 3/2009 | Safarian | H04B 1/0092 455/232.1 |
| 2009/0080497 A1 | 3/2009 | Wang et al. | |
| 2009/0157058 A1* | 6/2009 | Ferren | A61B 5/0031 604/891.1 |
| 2009/0168843 A1 | 7/2009 | Waters et al. | |
| 2009/0198859 A1* | 8/2009 | Orishko | G06F 13/385 710/313 |
| 2009/0286489 A1* | 11/2009 | Racherla | H04L 1/0002 455/74.1 |
| 2010/0049006 A1* | 2/2010 | Magar | A61B 5/0024 600/301 |
| 2010/0099366 A1* | 4/2010 | Sugar | H04B 1/005 455/75 |
| 2010/0111225 A1 | 5/2010 | Kroeger | |
| 2010/0137025 A1* | 6/2010 | Tal | H04B 15/02 455/553.1 |
| 2010/0157882 A1* | 6/2010 | Moriwaki | H04W 36/0005 370/328 |
| 2010/0234044 A1* | 9/2010 | Lohbihler | G01S 5/02 455/456.1 |
| 2010/0284446 A1 | 11/2010 | Mu et al. | |
| 2010/0324861 A1* | 12/2010 | Goulding | G06K 9/00335 702/150 |
| 2010/0329247 A1* | 12/2010 | Kennedy | H04B 1/7163 370/389 |
| 2011/0019561 A1* | 1/2011 | Yun | H04W 88/06 370/252 |
| 2011/0122795 A1* | 5/2011 | Hwang | H04L 1/206 370/252 |
| 2011/0130092 A1 | 6/2011 | Yun et al. | |
| 2012/0256492 A1* | 10/2012 | Song | H02J 1/102 307/66 |
| 2014/0092771 A1 | 4/2014 | Siomina et al. | |
| 2014/0222174 A1* | 8/2014 | Teller | A61B 5/01 700/91 |

FOREIGN PATENT DOCUMENTS

| | | |
|---|---|---|
| JP | 2000-041277 A | 2/2000 |
| KR | 10-2007-0103980 A | 10/2007 |
| WO | WO 2004/107590 A1 | 12/2004 |
| WO | WO 2005/099132 A1 | 10/2005 |
| WO | WO 2006/084046 A2 | 8/2006 |
| WO | WO 2006/084046 A3 | 9/2007 |
| WO | WO 2008/009574 A1 | 1/2008 |
| WO | WO 2009/055714 A2 | 4/2009 |
| WO | WO 2009/055714 A3 | 7/2010 |

OTHER PUBLICATIONS

Berny, et al. A 1.8-GHz LC VCO with 1.3-GHz tuning range and digital amplitude calibration. IEEE Journal of Solid-State Circuits. Apr. 2005; 40:909-917.

Bevilacqua, et al. An ultra-wideband CMOS LNA for 3.1 to 10.6 GHz wireless receivers. IEEE Int. Solid-State Circuits Conf. Dig. Tech. Papers, 2004; 1:382-533.

Bruccoleri, et al. Wide-Band CMOS Low-Noise Amplifier Exploiting Thermal Noise Canceling. IEEE Journal of Solid-State Circuits. Feb. 2004; 39:275-282.

Chen, et al. A Highly Linear Broadband CMOS LNA Employing Noise and Distortion Cancellation. RFIC—Radio Frequency Integrated Circuits (RFIC) Symposium, 2007 IEEE. 2007: 61-64.

Chien, et al. A 900-MHz local oscillator using a DLL-based frequency multipliertechnique for PCS applications. Solid-State Circuits Conference, 2000. Digest of Technical Papers. ISSCC. 2000 IEEE International. Feb. 8, 2000. IEEE Journal of Solid State Circuits. 2000; 35(12):1996-1999.

Cook, et al. An ultra-low power 2.4GHz RF transceiver for wireless sensor networks in 0.13um CMOS with 400mV supply and an integrated passive RX front-end. Proc. IEEE International Solid-State Circuits Conference (ISSCC.06), vol. 49, Feb. 2006, pp. 370-371.

Favre, et al. A 2-V 600-æA 1-GHz BiCMOS Super-Regenerative Receiver for ISM Applications. IEEE J. Solid-State Circuits. 1998; 33(12):2186-2196.

Gesbert, et al. From Theory to practice: an overview of MIMO space-time coded wireless systems. IEEE J. Selected Areas in Communications. Apr. 2003; 21(3): 281-302.

Haldi, et al. A 5.8 GHz Linear Power Amplifier in a Standard 90nm CMOS Process using a 1V Power Supply. RFIC—Radio Frequency Integrated Circuits (RFIC) Symposium, 2007 IEEE. 2007; 431-434.

International search report and written opinion dated Apr. 27, 2009 for PCT/US2008/081179.

International search report and written opinion dated Sep. 22, 2009 for PCT/US2009/033490.

Joehl, et al. A low-power 1-GHz super-regenerative transceiver with time-sharedPLL control. IEEE J. Solid-State Circuits. 2001; 36(7):1025-1031.

Liu, et al. A 1.2V, 2.4GHz fully integrated linear CMOS power amplifier with efficiency enhancement. Proceedings of CICC, 2006; p. 141-144.

Notice of allowance dated Jul. 8, 2014 for U.S. Appl. No. 12/866,189.
Notice of allowance dated Dec. 26, 2014 for U.S. Appl. No. 12/739,565.

O'Donnell, et al. An integrated, low power, ultra-wideband transceiver architecture for low-rate, indoor wireless system. Proc. IEEECAS Workshop on Wireless Communications and Networking, Pasadena, CA, Sep. 2002. (8 pages).

Office action dated Jan. 22, 2013 for U.S. Appl. No. 12/739,565.
Office action dated Feb. 24, 2014 for U.S. Appl. No. 12/739,565.
Office action dated Mar. 28, 2012 for U.S. Appl. No. 12/739,565.
Office action dated Mar. 28, 2013 for U.S. Appl. No. 12/866,189.
Office action dated Apr. 5, 2011 for U.S. Appl. No. 12/138,394.
Office action dated Nov. 16, 2011 for U.S. Appl. No. 12/138,394.
Office action dated Nov. 16, 2011 for U.S. Appl. No. 12/138,398.
Office action dated Dec. 10, 2012 for U.S. Appl. No. 12/138,394.
Office action dated Dec. 16, 2013 for U.S. Appl. No. 12/866,189.

Otis, et al. A 400 µW-RX, 1.6mW-TX super-regenerative transceiver for wireless sensor networks. Proc. IEEE International Solid-State Circuits Conference. 2005; 48: 396-397, 606.

Poobuapheun, et al. A 1.5V 0.7-2.5GHz CMOS Quadrature Demodulator for Multi-Band Direct-Conversion Receivers. Proceedings of CICC. 2006:797-800.

Ray, et al. On noncoherent MIMO channels in the wideband regime: capacity and reliability. IEEE Trans. Inform. Teory. Jun. 2007; 53(6):1983-2009.

Rothman, et al. The Diagnosis of Cardiac Arrhythmias: A Prospective Multi-Center Randomized Study Comparing Mobile Cardiac Outpatient Telemetry Versus Standard Loop Event Monitoring. Journal of Cardiovascular Electrophysiology. 2007;18(3):241-247.

Shahani, et al. A 12mW Wide Dynamic Range CMOS Front-End for a Portable GPS Receiver. IEEE Journal of Solid-State Circuits. 1997; 32:2061-2070.

UK combined search and examination report dated Jan. 24, 2012 for Application No. GB 1013574.7.

UK combined search and examination report dated Sep. 12, 2012 for Application No. GB 1215139.5.

Vouilloz, et al. A low-power CMOS super-regenerative receiver at 1 GHz. IEEE J. Solid-State Circuits. 2001; 36(3):440-451.

Wang, et al. Circuit Modeling Methodology for UWB Omnidirectional Small Antennas. IEEE Journal on Selected Areas in Communications. 2006; 24:871-877.

Wang, et al. Design of a Sub-mW 960-MHz UWB CMOS LNA. IEEE Journal of Solid-State Circuits. 2006; 41:2449-2456.

Zheng, et al. Communication on the Grassman manifold: a geometric approach to the noncoherent multiple-antenna channel. IEEE Trans. Inform. Teory. Feb. 2002; 48(2):359-383.

\* cited by examiner

WIRELESS COMMUNICATIONS SYSTEMS USING MULTIPLE RADIOS

CROSS-REFERENCE

This application is a continuation of U.S. patent application Ser. No. 12/866,189, filed Jan. 21, 2011, which is a national stage entry of PCT/US2009/033490, filed Feb. 6, 2009, which claims the benefit of U.S. Provisional Application No. 61/026,710, filed Feb. 6, 2008; U.S. Provisional Application No. 61/114,449, filed Nov. 13, 2008; U.S. Provisional Application No. 61/114,427, filed Nov. 13, 2008; U.S. Provisional Application No. 61/114,431, filed Nov. 13, 2008; and U.S. Provisional Application No. 61/114,418, filed Nov. 13, 2008, which applications are incorporated herein by reference.

FIELD OF THE INVENTION

The present invention relates generally to wireless communication systems and specifically to wireless communications systems using multiple radios.

BACKGROUND OF THE INVENTION

Wireless communications are implemented by any of a variety of radio technologies, depending on the type of application. Cellular phones, for example, may use the Global System for Mobile communications (GSM™), the IS-54 Time Division Multiple Access (TDMA) or the IS-95 Code Division Multiple Access (CDMA) radio technologies, whereas a wireless local area network may use Wi-Fi™ Bluetooth™ or ZigBee® radio technologies. In an ad-hoc, or peer-to-peer, network, a wireless device communicates directly with another wireless device. In an infrastructure network, a wireless device communicates with another wireless device through one or more intermediary gate devices, such as a base station or an access point. Generally, a wireless device uses a single radio technology to effect communication with its peer (in the case of a peer-to-peer network) or with the access point (in the case of an infrastructure network). In the prior art, dual radios are used in a wireless device to support different air interface standards, in order to provide compatibility with different wireless service providers. For example, a dual-radio device may support GSM, a cellular phone service, and Wi-Fi, a wireless Local Area Network (LAN) service, and uses one of these two radios for communication, depending on which service (GSM or Wi-Fi) is available in a geographic area. Generally, such a wireless device selects and uses a single radio for the duration of the connection or service.

The present invention relates to an innovative wireless communications system employing multiple radios. The communications system selects amongst and switches between multiple radios—possibly multiple times—while a connection or session is in progress. This switching allows the communications system to achieve one or more of the following performance objectives:

Maximize communications reliability and robustness against interference and other impairments
Minimize interference to co-existing users
Minimize power consumption
Accommodate any disparity between the uplink and downlink bandwidths Moreover, the multiple radio system can reduce the physical footprint of the radio nodes and lead to improved data rates and communication range.

When a single radio type is used, the degrees of freedom are limited for desired optimization. A given radio can be optimized, for example, by the following means:

Switch transmission channels within the given band to dynamically mitigate interference (to improve reliability).
Adjust transmitted power as needed (to improve power dissipation or reliability).

There are few other meaningful operations that can be performed to optimize single-radio systems. With a single type of radio, it is particularly challenging to design a system that calls for simultaneous optimization of multiple factors—for example, optimization of all of these four factors: link range/reliability, node power, node cost and low interference to other radios. If a radio is optimized for one factor, it will typically negatively impact other factors. For example, if power is reduced for a low-power design, it would typically reduce the range/reliability. If an ultra-wideband (UWB) radio is deployed to cause minimum interference to other radios, it would result in short range, high complexity and potentially high cost (the UWB receiver being complex and high power).

Accordingly, a radio scheme is desired for a wireless communication system that addresses the optimization of multiple factors.

SUMMARY OF THE INVENTION

In one aspect, the present invention discloses a node comprising a first radio constructed and arranged to function as at least one of a transmitter and a receiver, and a second radio constructed and arranged to function as at least one of a transmitter and a receiver, wherein the first radio and second radios are complementary. In some embodiments, the first radio is constructed and arranged to transmit and to receive signals and the second radio is also constructed and arranged to transmit and to receive signals.

In another aspect, the present invention discloses a communication system comprising a node as described above, the node forming a first node and the first and second radios forming a first set of complementary radio. The communication further comprises a second node, the second node including a second set of complementary radios for transmitting and receiving signals. The first and second nodes are in wireless communication via the first and second sets of complementary radios.

In another aspect, the present invention discloses a communication system comprising a node as described above, the node forming a first node and the first and second radios forming a first set of complementary radios. The communication further comprises a second node comprising a second set of complementary radios for transmitting and receiving signals. The first and second nodes are constructed and arranged to wirelessly communicate via both the first and second sets of complementary radios.

In another aspect, the present invention discloses a communication system comprising a base node for transmitting and receiving signals, the base node comprising a first plurality of resources; and at least one peripheral node for transmitting and receiving signals, the at least one peripheral node comprising a second plurality of resources. The base node and the at least one peripheral node are in wireless communication and the first plurality of resources is greater than the second plurality of resources.

In another aspect, the present invention discloses a communication system comprising a base node comprising a first set complementary radios for transmitting and receiving signals, and at least one peripheral node comprising a second set of complementary radios for transmitting and receiving signals. The base node and the at least one peripheral node are constructed and arranged to wirelessly communicate via both the first and second sets of complementary radios. In some embodiments, the base node consumes more power than each individual peripheral node.

In another aspect, the present invention discloses a communication system comprising a base node comprising a first set of complementary means for transmitting and receiving signals, and at least one peripheral node comprising a second set of complementary means for transmitting and receiving signals. The base node and the at least one peripheral node comprise a means for wirelessly communicating via both the first and second sets of complementary means for transmitting and receiving signals. In some embodiments, the base node consumes more power than each individual peripheral node.

In another aspect, the present invention discloses a method for using two or more complementary radios in a communication system comprising either or both of the following steps: 1) selecting one or more of the complementary radios to form a connection; and 2) switching between one or more of the complementary radios to maintain a connection.

In another aspect, the present invention discloses a method for using two or more complementary radios in a communication system comprising either or both of the following steps: 1) activating at least one complementary radio to form a connection; and 2) activating one or more inactive complementary radios to maintain a connection.

In another aspect, the present invention discloses a method for using two or more complementary radios in a communication system comprising either or both of the following steps: 1) selecting one complementary radio from the at least two complementary radios to form a new connection; and 2) switching between a first complementary radio and a second complementary radio during a connection.

In some embodiments of the above methods, only one of the complementary radios is selected or activated to form a connection and only one of the complementary radios is switched to or activated to maintain a connection. In other embodiments of the above methods, the communication system selects which of the complementary radios is active. In other embodiments of the above methods, the communication system selects which of the complementary radios is used to form or maintain a connection in order to meet a performance objective. In other embodiments of the above methods, the transmitter associated with each of the complementary radios transmits substantially simultaneously and the receiver associated with each of the complementary radios combines signals from the complementary radios.

In another aspect, the present invention discloses a device for implementing a complementary radio system comprising two or more complementary radios, means for selecting one or more of the complementary radios to form a connection, and means for switching between one or more of the complementary radios during the connection.

In another aspect, the present invention discloses a device for implementing a complementary radio system comprising two or more complementary radios, means for activating one or more of the complementary radios simultaneously, means for transmitting a signal from each of the complementary radios substantially simultaneously, and means for combining signals from the complementary radios.

In another aspect, the present invention discloses a method for switching radio connections in a complementary radio communication system, comprising establishing a forward radio connection and a reverse radio connection between a first node and a second node, each node comprising two or more complementary radios, wherein the forward radio connection transmits data from the first node to the second node, and the reverse radio connection transmits data from the second node to the first node. The method further comprises monitoring the communication quality of the forward radio connection on the second node until the communication quality of the forward radio connection falls below a performance criteria, then transmitting a control message from the second node to the first node using the reverse radio connection established above. The control message comprises a message to switch to an alternate radio connection selected by the second node. The connection is then reestablished using the alternate radio connection. In some embodiments of the method, transmission of the control message is repeated until the first node transmits data to the second node on the alternate radio connection within a predetermined time interval. In some embodiments, the second node continues to listen on the forward radio connection in the initial step until the first node transmits data to the second node on the alternate radio connection within the predetermined time interval. In some embodiments, the data transmitted from the first node to the second node comprises an acknowledgement in response to the control message. In some embodiments, the second node consumes more resources than the first node.

In another aspect, the present invention discloses a receiver comprising a means for amplification, a configurable means for filtering comprising a means for communication with the amplification means, and at least one configurable device comprising means for communication with the configurable filter. The receiver also comprises at least one means for analog to digital conversion further comprising means for communication with the at least one configurable device. The configurable means for filtering is constructed and arranged to function as a bandpass filter when the receiver is used as a narrowband receiver and to function as a low pass filter when the receiver is used as an ultra-wideband receiver.

In another aspect, the present invention discloses a receiver comprising a means for amplification, a configurable means for filtering in electronic communication with the means for amplification, and at least one configurable device electrically communicable with the configurable means for filtering. The receiver also comprises at least one means for analog to digital conversion in electrical communication with the at least one configurable device. The configurable means for filtering is constructed and arranged to function as a bandpass filter when the receiver is used as a narrowband receiver and to function as a low pass filter when the receiver is used as an ultra-wideband receiver.

In another aspect, the present invention discloses a receiver comprising an amplifier, a configurable filter comprising means for communication with the amplifier, at least one configurable device comprising means for communication with the configurable filter, and at least one analog to digital converter comprising means for communication with the at least one configurable device. The wherein the configurable filter is constructed and arranged to function as a bandpass filter when the receiver is used as a narrowband receiver and to function as a low pass filter when the receiver is used as an ultra-wideband receiver.

In another aspect, the present invention discloses a receiver comprising an amplifier, a configurable filter in electronic communication with the amplifier, at least one configurable device in electrical communication with the configurable filter, and at least one analog to digital converter in electrical communication with the at least one configurable device. The configurable filter is constructed and arranged to function as a bandpass filter when the receiver is used as a narrowband receiver and to function as a low pass filter when the receiver is used as an ultra-wideband receiver.

In another aspect, the present invention discloses a receiver comprising an amplifier, a configurable filter coupled to the amplifier, a bank of configurable devices coupled to the configurable filter, and a plurality of analog to digital converters coupled to the bank of configurable devices. The configurable filter is configured into a bandpass filter when the receiver is utilized as a narrowband receiver and is configured into a low pass filter when the receiver is utilized as an ultra-wideband receiver.

In some embodiments of the receivers of the invention, the configurable device is configured as a means for mixing when the receiver is used as a narrowband receiver and is configured as a means for switching when the receiver is an ultra-wideband receiver.

In other aspects, the present invention discloses a kit comprising one or more nodes as described above. In still other aspects, the present invention discloses a kit comprising a communication system as described above. In other aspects, the present invention discloses a kit comprising one or more receivers as described above.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
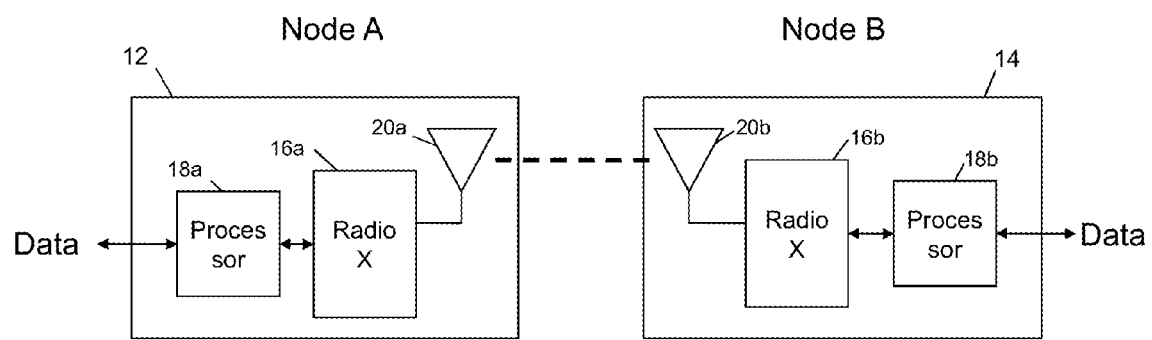
FIG. 1 illustrates a wireless communications system deploying a single radio type.

A wireless communications system 10 comprises at least two nodes 12 and 14 communicating with each other as shown in FIG. 1. The two nodes 12 and 14 communicate through a radio system, 16a and 16b, respectively, via antennas 20a and 20b. The radios on both sides (16a and 16b) are of the same type, called Radio X. As shown, the data can be optionally preprocessed by processor 18a, making it suitable for radio transmission, before it is fed to radio system 16. On the receiving end, the data can be post processed by the processor 18b to recover the originally sent data. Based on the requirements of a given system, the radio system 16 can be optimized in certain ways. Following are some examples of the factors that can be optimized:

Low power dissipation of nodes;
Low cost of nodes;
High link reliability (immunity to fading, interference and noise);
Small physical foot print of the nodes;
High data rates;
Large communication range; or
Cause minimum interference to other radio systems (e.g., quiet radio).

There can be many more optimization factors. As shown in FIG. 1, conventional communication systems employ a single radio type X that can be designed to achieve certain level of optimization. Some examples of Radio X are Wi-Fi, Bluetooth™ and Zigbee®.

I. Asymmetric Wireless Systems

Figure 2:
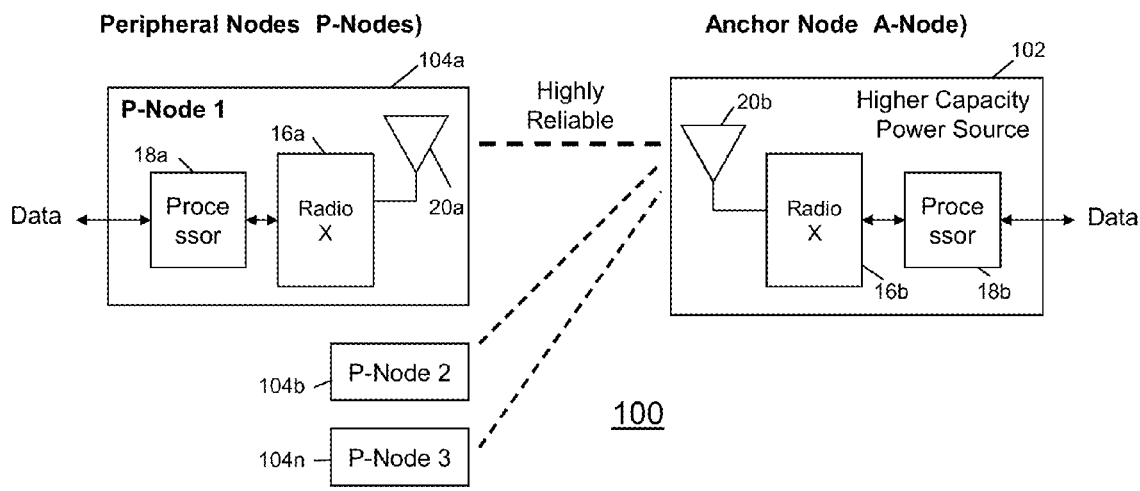
FIG. 2 illustrates a conventional asymmetric wireless communication system deploying a single radio type.

In many applications there exists an asymmetry between two nodes wirelessly communicating with each other, as shown in FIG. 2. In these systems, there is an anchor node (A-Node) 102 which collects data from one or more nodes called peripheral nodes (P-Node or P-Nodes) 104a-104n. The P-Nodes 104a-104n typically operate using a small power source (e.g., a small battery or an energy harvesting device). The A-Node 102 typically has access to a higher capacity power source (larger battery or a power supply). Furthermore, in such systems, P-Nodes 104a-104n primarily transmit the data to A-Node 102. The data flow from A-Node 102 to P-Nodes 104a-104n is usually minimal, comprising mostly signals to control the P-Nodes 104a-104n. In summary, there can be an asymmetry in terms of data flow and power sources in the system of FIG. 2. The following are some examples of this type of asymmetric systems.

Wireless Healthcare Systems:

In wireless health monitoring systems, P-Nodes 104a-104n can reside on wireless patches attached to a person's body or they can reside on wireless devices implanted within a person's body. These wireless patches/devices collect physiological data from various body sensors attached to P-Nodes 104a-104n and wirelessly transmit data to the A-Node 102 within the range of P-Nodes 104a-104n. The P-Nodes 104a-104n can send the data to the A-Node 102 using various schemes, e.g., continuously, periodically or episodically. Some examples of physiological data sent by P-Nodes 104a-104n are electrocardiogram (ECG), electroencephelogram (EEG), electromyogram (EMG), heart rate, temperature, saturation of peripheral oxygen (SpO2), respiration, blood pressure, blood glucose and patient's physical activity (movement). The A-Node 102 receiving data from P-Nodes 104a-104n, will normally reside in some type of patient monitoring device that collects, analyzes and manages the physiological data. Some examples of patient monitors are bed-side patient monitors in hospitals, Holter monitors (ambulatory electrocardiography device) for ambulatory ECG, blood glucose monitors, wearable physiological parameter monitors for athletes, safety monitoring units for industrial workers and SmartPhones supporting patient monitoring.

Wireless Industrial Sensors:

In such systems, P-Nodes 104a-104n can reside on various industrial or home devices such as furnaces, smoke detectors, movement detectors, electrical/gas/water usage meters, etc. The P-Nodes 104a-104n can transmit various types of sensor data (e.g. temperature, mechanical stress, chemicals, and meter readings) or some other type of information. The A-Nodes 102 can reside on portable readers, data gathering computers, wireless access points, etc.; these devices wirelessly receive data from the devices connected to P-Nodes 104a-104n.

Active Radio-Frequency Identification (RFID):

In such applications, P-Nodes 104a-104n can reside on various assets that need to be tracked or inventoried, such as capital equipment in hospitals, factories, offices, etc. The A-Nodes 102 can reside on devices such as portable readers, wireless access points and computers. These devices will wirelessly receive data from the devices having P-Nodes 104a-104n. Furthermore, locations of asset items can be tracked by using an array of wireless access points and certain location tracking algorithms. The location of patients can also be tracked using the same scheme.

Wireless Audio Systems:

In such systems, P-Nodes 104a-104n can reside on devices such as wireless microphones and wireless musical instruments, e.g., electric guitar, and wirelessly transmit audio or voice signals. The A-Node 102 can reside on devices such as wireless speakers, amplifiers, cellular phones or access points enabling subsequent data transmission. The devices having A-Node 102 will wirelessly receive data from the devices having P-Nodes 104a-104n.

Wireless Video Systems:

In such systems, P-Nodes 104a-104n can reside on devices such as wireless cameras (or any device containing a camera such as a laptop, cell phone, etc), digital video disk (DVD) players, television tuners and television set top boxes. Such devices can transmit video signals. The A-Node 102 can reside on devices such as wireless displays, access points, or access points enabling subsequent transmission. The devices having A-Node 102 will wirelessly receive data from the devices having P-Nodes 104a-104n.

The above systems typically communicate wirelessly within a range of about 25-50 meters in an indoor or outdoor environment, the range of a typical wireless local area network (WLAN). Some applications can dictate a larger range.

II. Optimized Asymmetric Wireless System

The commercial viability of asymmetric wireless systems discussed above (shown in FIG. 2) imposes special design constraints. These systems need to continuously transmit sensitive data in real time within a defined range, typically 25 to 50 meters. Within this range, wireless communication should be highly reliable without any data loss. Many radios are severely hampered by interference and multi-path fading. The present invention discloses schemes devised to overcome such issues. In addition, it can be desirable for P-Nodes 104a-104n to use low power as they may have to operate from small power sources for many days. Furthermore, in many of the applications discussed above, P-Nodes 104a-104n can be cost sensitive. For example, P-Nodes 104a-104n can be part of disposable wireless patches in the case of healthcare applications. Also, it can be desirable for P-Nodes 104a-104n to be physically small, typically realized in one, or a few, semiconductor chips so as to have a small footprint. The present invention discloses a radio scheme suitable for such semiconductor chip integration.

In summary, these asymmetric wireless systems can be optimized to achieve at least the following factors:

High reliability—Highly robust wireless links within its range, with a very high degree of mitigation capability against the effects of multipath fading, noise and interference;

Low power—Low power dissipation by the P-Nodes 104a-n in order to work for several days in continuous transmission mode from a small power source;

Low cost—Low cost P-Nodes 104a-104n for commercial viability; and

Small physical size—Suitable radio functionality for implementation as low cost semiconductor devices (small silicon area).

The P-Nodes can be constrained low power, low cost, and small. On the other hand, the A-Nodes can sometimes afford to be higher power, higher cost and larger due to the asymmetrical nature of various applications.

An asymmetric wireless system that is optimized to achieve the above mentioned factors is referred to as optimized asymmetric wireless (OAW) system. The realization of OAW system requires a highly optimized radio scheme as a foundational technology. This radio can be combined with other functions and technologies to realize an integrated chip(s) based solution to implement the P-Nodes and A-Nodes.

Traditionally, as shown in FIG. 2, wireless systems are built using one basic type of radio (shown as Radio 16a, 16b) that establishes a wireless link between the two given nodes. This radio typically operates within certain defined bandwidth and the overall design is typically optimized for a class of applications. Below are some examples of the radios that have been previously used for local area type of networks.

Wi-Fi:

This radio type, which operates in the 2.4 GHz unlicensed Industrial, Scientific and Medical (ISM) band, has been optimized for wirelessly networking computers and computer related devices within a range up to about 50 meters. The power dissipation and reliability is modest. The modest reliability can be tolerated by the target applications.

Bluetooth:

This radio type, which also operates in 2.4 GHz unlicensed ISM band, has been optimized to wirelessly cable various peripheral devices to cellular phones and laptop computers. It is somewhat lower data rate, lower power and lower cost than Wi-Fi radios but is shorter range (about 10 meters) and lacks extensive networking capability. Its reliability is modest per target applications.

ZigBee:

ZigBee is the name of a specification for a suite of high level communication protocols using small, low-power digital radios based on the IEEE 802.15.4-2006 standard for wireless personal area networks (WPANs). ZigBee is targeted at radio-frequency (RF) applications that require a low data rate, long battery life, and secure networking. This radio type operates in the 2.4 GHz, 915 MHz and 868 MHz unlicensed ISM bands. It was defined to wirelessly network various low data rate sensors with data collection devices. It was intended to be lower power than Wi-Fi style radios but is little different in practice.

900 MHz Industrial, Scientific and Medical (ISM) Band Radios:

Radios have been realized in this unlicensed band for various consumer and other applications, e.g., cordless phones, remote control toys. The general characteristics of such radios (power, reliability, cost, etc.) are similar to Wi-Fi radios.

Medical Implantable Communications System (MICS):

These radios operate in unlicensed 400 MHz band that has been designated for wireless implanted medical devices. It operates in extremely small bandwidth, typically having a short range of about 5 meters and very low data rates associated with implanted medical devices.

Wireless Medical Telemetry Service (WMTS):

The WMTS radios operate in the 600 MHz and 1400 MHz. These radios are designed for use in hospital environments. Again, general characteristics of these radios are similar to Wi-Fi radios.

The radios discussed above fall generally in a class defined as Narrowband (NB) radios. There is another class of radios called ultra-wideband (UWB) radios. UWB radios transmit over a much larger bandwidth than NB radios but UWB transmitted power density is far lower than the NB radios. For example, the Federal Communications Commission (FCC) defines UWB as fractional bandwidth measured at −10 decibel (dB) points where (f_high−f_low)/f_center>20% or total bandwidth>500 MHz. NB radio, as used herein, is any radio that is not ultra-wideband (UWB) radio. Alternatively, a NB radio may be characterized in terms of the UWB radio, the NB radio having a channel bandwidth that is smaller than the UWB radio channel bandwidth by an order of magnitude or more. The UWB and NB radios have complementary properties as discuss later.

Typically only one radio is used for a given communication link. This could be a single radio type from the above mentioned types or some other custom design. A system and method in accordance with the present invention relates to combining multiple radio types with complementary characteristics to enable and maintain communication link between two nodes. The complementary radios are switched in and out, as needed, to dynamically manage the link characteristics to achieve the desired optimization.

When multiple radios have been integrated on a single chip, the purpose has been primarily the optimization of the cost and physical footprint and only one radio is used for a given communication link. One example is integration of a wireless protocol utilizing short-range communications technology facilitating data transmission over short distances from fixed and mobile devices, creating wireless personal area networks (PANs) such as Bluetooth™, and a wireless technology used in networks, mobile phones, and other electronic devices that require some form of wireless networking capability, such as Wi-Fi, which typically covers the various IEEE 802.11 technologies including 802.11a, 802.11b, 802.11g, and 802.11n. This integration of multiple radios, e.g., Bluetooth and Wi-Fi, can be achieved in a single chip or a single module. If such module is deployed, for example, in a laptop computer, the Wi-Fi radio is used to wirelessly network with other computers, whereas the Bluetooth radio is used to connect wirelessly with peripherals such as keyboard and mouse. Another example consists of dual radios used in a mobile phone to support different air interface standards, in order to provide compatibility with different wireless service providers. For example, a dual-radio phone may support cellular service such as a global system for mobile communications (GSM) and a wireless LAN service such as IEEE 802.11b, and switch between the two radios depending on which service is available in a geographic area.

In these examples, the communication device selects and uses a single radio for the duration of the connection or service. These systems contain no concept of combining multiple radios with complementary properties to establish and maintain a single communication link between two or more points. In contrast, the present invention provides a system involving multiple radios with complementary characteristics for selecting amongst and choosing between those multiple radios in order to achieve, for example, one or more of the following performance objectives:

Maximize communications reliability and robustness against interference and other impairments;

Minimize interference to co-existing users;

Minimize power consumption; and

Accommodate disparity between the uplink and downlink bandwidths.

Moreover, switching from one radio to another can occur—possibly multiple times—while a connection or session is in progress. This radio switching differs from typical channel assignment. Channel assignment is the process of selecting one out of multiple channels for communication, where the channels share a common structure. For example, in frequency division multiple access, all channels are frequency bands; and in time division multiple access, channels consist of timeslots. By contrast, in the present invention, radio switching needs to take into account the structures of the radios, which are considerably more complex than the structure of a radio channel. Moreover, the structure of one radio may have little in common with the structure of another. For example, the receiver sensitivity, spectrum usage, permissible radiated power and inherent interference mitigation generally differ between the radios. The differences in radio structures, together with the set of performance objectives and the radio propagation environment, can be used to determine the initial radio selection and subsequent radio switching.

III. Complementary Multi-Radios

Figure 3:
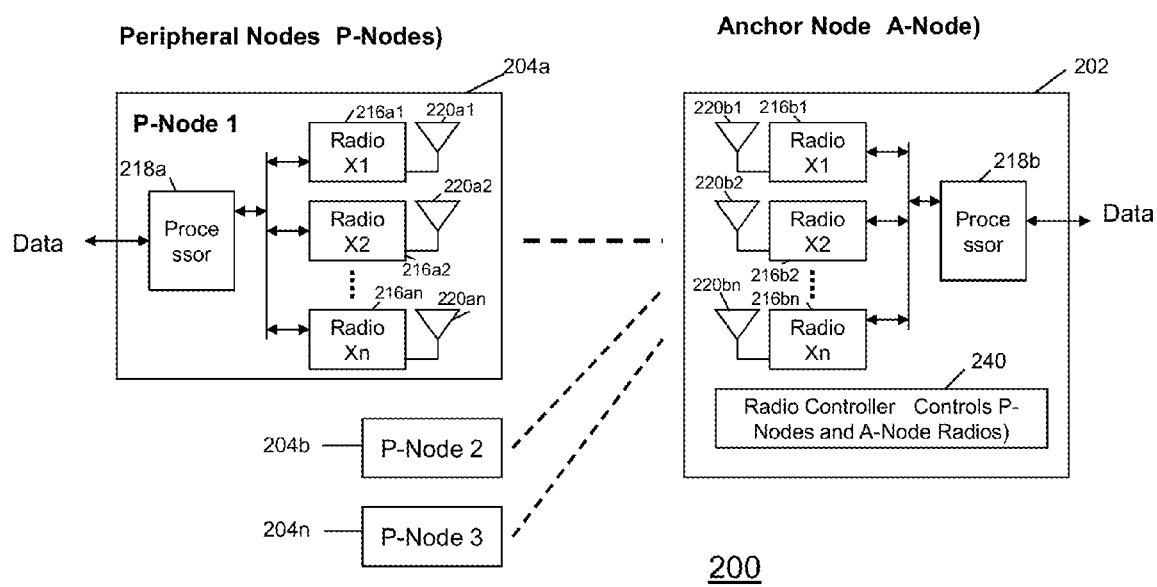
FIG. 3 illustrates a system for deploying multiple radios in accordance with the present invention.

In one embodiment, a system 200 in accordance with the present invention deploys multiple radios to realize an optimized asymmetric wireless (OAW) system, as shown in FIG. 3. As shown, the P-Nodes 204a-204n comprise multiple radios 216a1-216an. There are corresponding multiple radios 216b1-216bn on the A-Node 202 to facilitate wireless communication between the P-Nodes and the A-Node. Each of these radios 216a1-216an (and corresponding radios 216b1-

216bn) can be optimized for different factors, thereby complementing each other. At any given time, one or more of these radios $216a_1$-$216a_n$ (and corresponding radios $216b_1$-$216b_n$) can be activated for communication depending on the optimization required and real-time dynamics of the wireless link/channel.

In some embodiments, one of the radios, for example radio $216a_1$ and $216b_1$, can be the dominant radio that is used most commonly. This radio pair $216a_1/216b_1$ can be designed to achieve the optimization most critical for the given application. In an OAW system, one can, e.g., achieve low power with high reliability within a given range, for example, 25 meters. In one example, the P-Nodes 204a-204n remain within 10 meters of the A-Node 202 most of the time, e.g., more than 50% of the time, more than 60% of the time, more than 70% of the time, more than 80% of the time, or more than 90% of the time. For this application, the dominant radio (radio $216a_1$) can be a radio that operates at ultra low power within 10 meters of the range. Furthermore, this radio $216a_1/216b_1$ can be designed to be highly reliable within this range causing minimum outages in the target operating environment. In this application, another radio, for example the radio pair $216a_2/216b_2$, can be employed with a range up to 25 meters but dissipating more power than radio $216a1/216b1$. In some embodiments, the outage characteristics of radio $216a_2/216b_2$ can be complementary to radio $216a_1/216b_1$ so that radio $216a_2/216b_2$ will most likely work if there is an outage of radio $216a_1/216b_1$ due to interference, multi-path fading or any other reason. Radio $216a_2/216b_2$ can also takeover when P-Node 204a-204n moves beyond the range served by radio $216a_1/216b_1$. Also, radio $216a_2/216b_2$ can takeover if there is an outage of radio $216a_1/216b_1$ (provided radio $216a_2/216b_2$ is not impacted by the circumstances that caused outage on radio $216a_1/216b_1$). In some embodiments, a third or more radios $216a_1$-$216a_n$ can be used to cover different operating conditions if necessary. In other embodiments, two radios serve the targeted applications. In these embodiments, low power can be achieved where low power radio $216a_1/216b_1$ is predominantly in use. Other radios can be used only as needed and for short durations when possible. In aggregate, these embodiments can achieve low power for the P-Nodes, high reliability with minimal outages, and work within a given range of 25 meters.

The above embodiments illustrate the complementary radios $216a_1$-$216a_n$ (and corresponding set $216b_1$-$216b_n$) and combinations thereof to serve a given requirement. The radios $216a_1$-$216a_n$ can be complementary in other ways. Some example complementary properties follow.

Bandwidth:

One radio can use a wide bandwidth signal but a narrow time signal. The other radio can use a narrow bandwidth having a wide time signal (many cycles of a carrier) and occupy a narrow range of frequencies. Both radios will have different resulting characteristics.

Power Levels:

One radio may transmit more power in one band to attain larger range but the implementation of a transmitter in this band may be less power efficient. The other radio can work in a different band where transmission is more power efficient.

Receiver Sensitivity (Range/Reliability):

One radio may be more sensitive in one band but may not be power efficient. The other radio in a different band may be power efficient but less sensitive.

Interference to Other Radios ("Quietness"):

One radio can act as an interferer to other radios in a given radio environment whereas the other radio can be quiet.

Fading Characteristics:

Fading of the transmitted signal can result from multi path effects resulting in signal loss or total outage at the receiver. Different frequencies suffer different fading. Two radios can be designed to have somewhat complementary fading characteristics to reduce the probability of both having severe fading under the same conditions.

The complementary radios can be all narrowband (NB) radios with different optimizations or they all can be Ultra-wide band (UWB) radios with different optimizations, or they can be a mixture of NB and UWB radios. The UWB and NB radios are highly complementary in many ways as discussed below:

- UWB radios typically have a short range in an indoor environment (up to about 10 meters). On the other hand, NB radios can provide larger range by transmitting higher power as allowed by FCC in the operating band.
- UWB transmitters are typically simple to implement, resulting in small silicon area and low power dissipation. NB radio transmitters take up larger silicon area and result in higher power dissipation than UWB transmitters.
- UWB receivers are complex and dissipate high power. NB radio receivers have modest complexity and dissipate modest power.
- UWB radios cause minimum interference to other radios because they operate close to the noise floor of other radios. NB radios cause interference to other radios when operating in unlicensed bands.
- UWB can handle some narrowband interference via its de-spreading (narrowband interference) capability at the receiver. However, a strong narrowband interferer could degrade its signal quality. A NB radio can switch to a different channel within its band of operation when another strong NB interferer appears in the current channel. It can survive low broadband interference, but it cannot mitigate strong broadband interference as all NB channels degrade equally.

Within a given system, the designs with optimum complementary properties can be used to realize the radios $216a_1$-$216a_n/216b_1$-$216b_n$ shown in FIG. 3.

IV. Cost and Physical Size

Embodiments of the present invention disclosed above illustrate how low power and high reliability can be achieved for a given range in a multi-radio optimized asymmetric wireless (OAW) system. As stated before, OAW systems also need to optimize the cost and physical footprint, particularly for the P-Nodes 204a-n. This can be achieved using various concepts as discussed below.

Firstly, complementary multiple radio schemes can be chosen in such a way that semiconductor implementation complexity of the P-Nodes 204a-n remains much lower than the complexity of A-Node 202. As discussed previously, in a typical OAW system, the data mostly flows from the P-Nodes 204a-n to A-Node 202. Radios for the P-Nodes 204a-n predominantly need a reliable transmitter for continuous transmission and a receiver only for less frequent reception. Radios for the P-Nodes 204a-n can be chosen that are optimized to achieve these two functions at a low complexity.

As shown in FIG. 3, the multi-radio system also includes a controller 240 to coordinate the selection and functionality all the radios. The controller 240 continuously assesses the communication link quality and runs algorithms to determine which radio to use at a given time. It also sends commands to radios of the A-Node 202 and P-Nodes 204a-n to activate/deactivate the radios in real time. Such switching constantly may maintain the communication link without any data loss.

As shown in FIG. 3, the controller 240 can reside in A-Node 202 to keep the complexity of P-Nodes 204a-n low.

Furthermore, in some embodiments, one or more radios out of $216b_1$-$216b_n$ on the A-Nodes 202 can use multiple smart antenna schemes to increase the link reliability and range. This involves replicating one or more antennas $220b_1$-$220b_n$ for the radio or radios chosen for the multiple-antenna scheme. Multiple antennas add complexity to the chosen radio or radios since multiple radio frequency (RF) transceivers must be built for the multiple antennas and a signal processor is needed for antenna combining algorithms. The corresponding radios of P-Nodes 204a-n can still have single antenna schemes $216a_1$-$216a_n$. This embodiment provides the advantages of multiple antennas to increase the range and reliability of the wireless link, but only adds the circuit and processing complexity to the A-Node 202 to reduce the complexity and cost of the P-Nodes 204a-n.

The above mentioned embodiments help to keep the P-Nodes 204a-n relatively simple and low cost by pushing the complexity to the A-Nodes 202.

Figure 4:
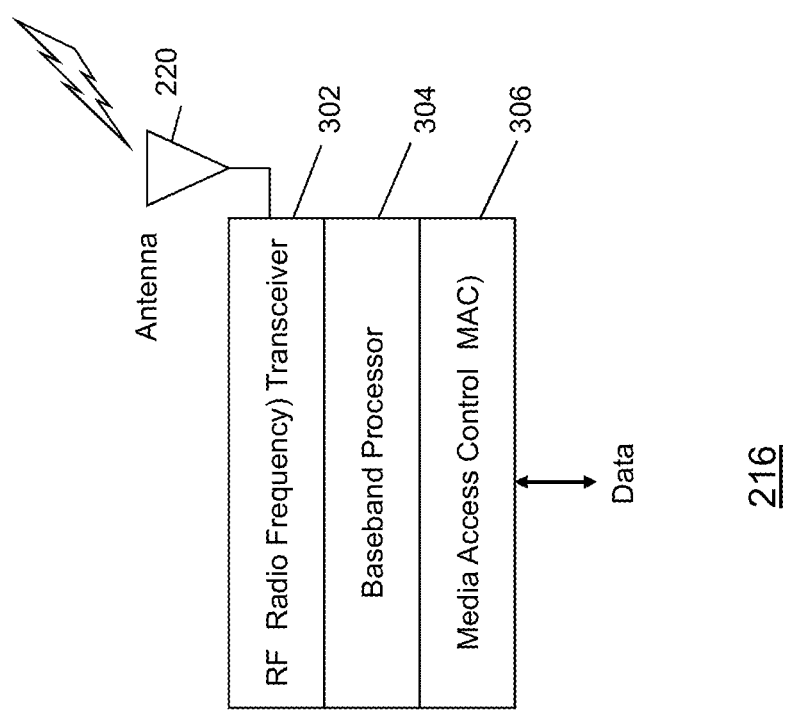
FIG. 4 illustrates the different elements of a digital radio.

The deployment of multiple radios, in general, can escalate the cost if precautions are not taken. To minimize costs, the multiple radios can be implemented effectively by sharing resources between them when possible. The different elements of a typical radio, shown as 216 in FIG. 4, can be described as below.

MAC (Media Access Control) 306:

The MAC section implements a protocol that allows data to flow through the radio to and from multiple sources.

Baseband Processor 304:

The baseband section modulates or demodulates the data and performs other signal processing functions for the radio to function and contains digital/analog and analog/digital converters to interface to the radio frequency (RF) transceiver.

Radio Frequency (RF) Transceiver 302:

The RF section converts the baseband analog signal to radio frequency that is fed to antenna 220 for transmission. Signal received from antenna 220 can be converted back to the baseband signal.

Antenna 220.

To reduce costs, it is desirable to use complementary radios where resources of the above mentioned sections are shared or configured to realize multiple radios, thereby reducing overall semiconductor implementation costs. For example:

RF: The RF transceiver 302 can be reconfigurable to realize different types of radios by varying carrier frequencies, bandwidth, transmitted power, etc.

Baseband: The baseband processor 304 can use a programmable processor to implement certain functions for different radios. Certain sections of the baseband can be hardwired for different radios. Other sections of the baseband can be shared and reused for different radios. Such mixed programmable/custom architecture typically results in a low cost implementation.

MAC: A single MAC 306 protocol can be designed to serve multiple chosen radios. Furthermore, the main core of the protocol can be implemented using a programmable processor that provides some customization for different radios.

Antenna: Antenna 220 architectures can be defined to work at wide ranging carrier frequencies and bandwidths to support multiple radios.

The combination of various concepts discussed in this section can result in cost effective and physically small chipsets for the P-Nodes 204a-n and A-Node 202. Certain specific embodiments of these concepts are discussed below.

V. Complementary NB/UWB System

As disclosed herein, multiple complementary radios in an OAW system can comprise:

All NB radios with different desired characteristics;

All UWB radios with different desired characteristics; or

—A mix of NB and UWB radios.

Figure 5:
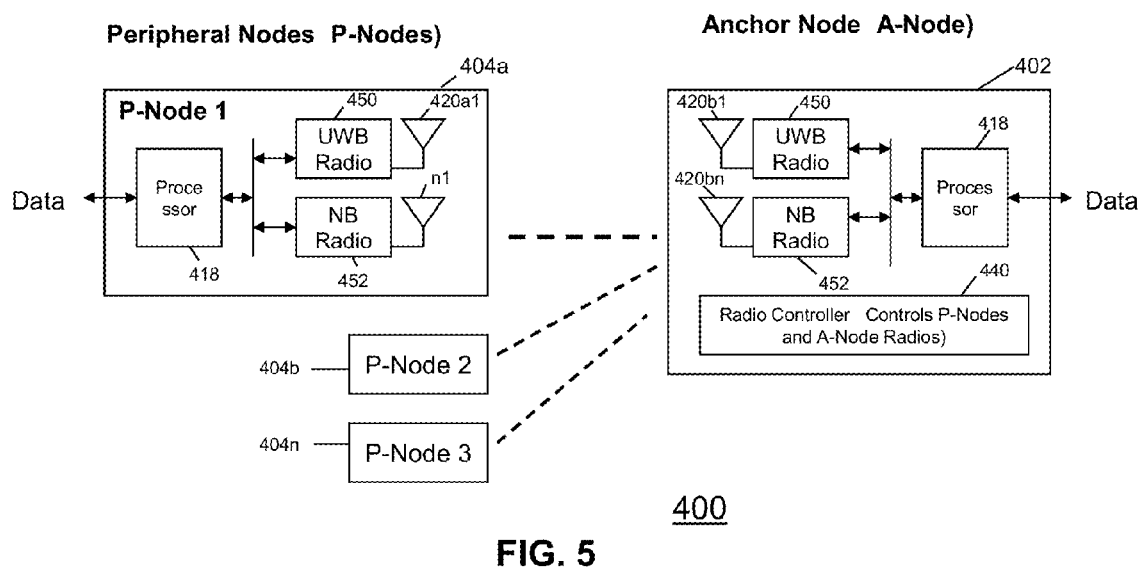
FIG. 5 illustrates one embodiment of the multi-radio scheme containing one narrow band (NB) radio and one ultra-wideband (UWB) radio.
Figure 6:
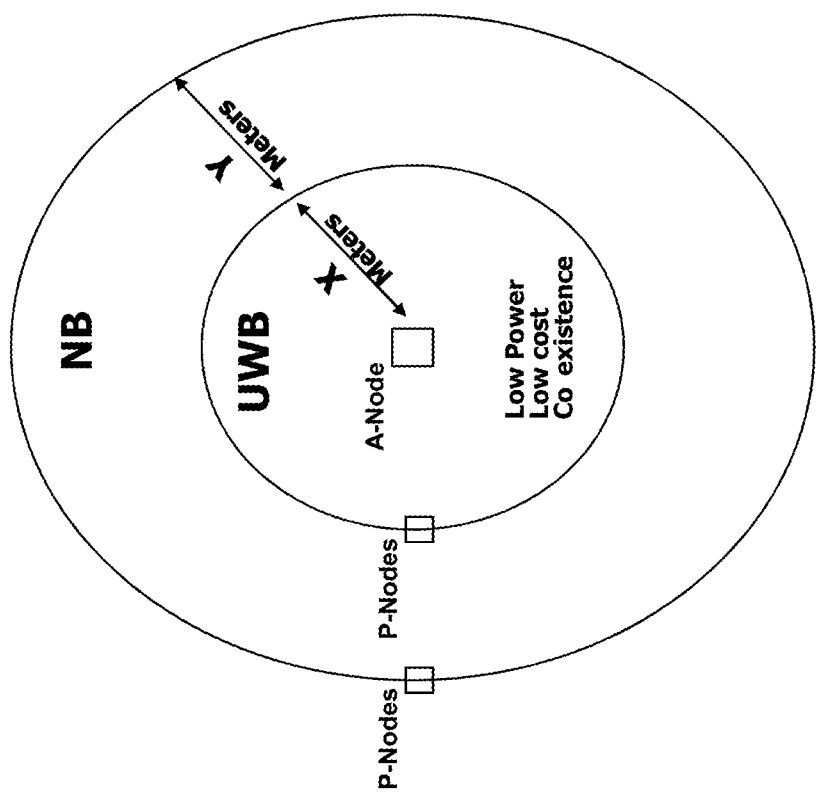
FIG. 6 illustrates the range of the UWB/NB radio system in accordance with an embodiment.

One embodiment of a multi-radio scheme contains one NB radio 452 and one UWB 450 radio, as shown in FIG. 5. This NB/UWB scheme can be useful for a variety of OAW systems. As discussed before, the NB 452 and UWB 450 radios have complementary characteristics, making them suitable for an OAW system. The complementary UWB/NB radio system can operate as shown in FIG. 6. The ranges of the UWB and NB radios are respectively X and X+Y, where the UWB range is usually smaller than the NB radios. In many embodiments, the P-Nodes remain primarily within distance X of the A-Node, in range of the UWB radio. If P-Nodes move beyond distance X from the A-Node, but remain within the X+Y range, the NB radio can take over. Also, if the UWB radio suffers an outage for any reason, the NB radio can be used for communication. Dominant use of the UWB radio results in overall lower power dissipation and causes minimal interference to other radios. On the other hand, the NB radio, which primarily backs up the UWB radio, guarantees a larger system range up to X+Y. The availability of both UWB and NB radios can greatly increase the system reliability due to radio diversity. The UWB and NB radios normally suffer outages due to different types of circumstances (different interferences, different multi-patch fading effects, different wall penetration properties, etc.). Therefore, this embodiment increases the probability that one of the radios is available for communication.

As mentioned previously, there are many types of standards based radios that can be deployed as NB radios, including Wi-Fi, Bluetooth, ZigBee, WMTS, MICS, 900 MHz ISM band radios, 2.4 GHz ISM band radios, 5 GHz ISM band radios, 60 GHz ISM band radios, etc. In some embodiments, custom NB radios can be deployed as dictated by the system requirements.

Figure 7:
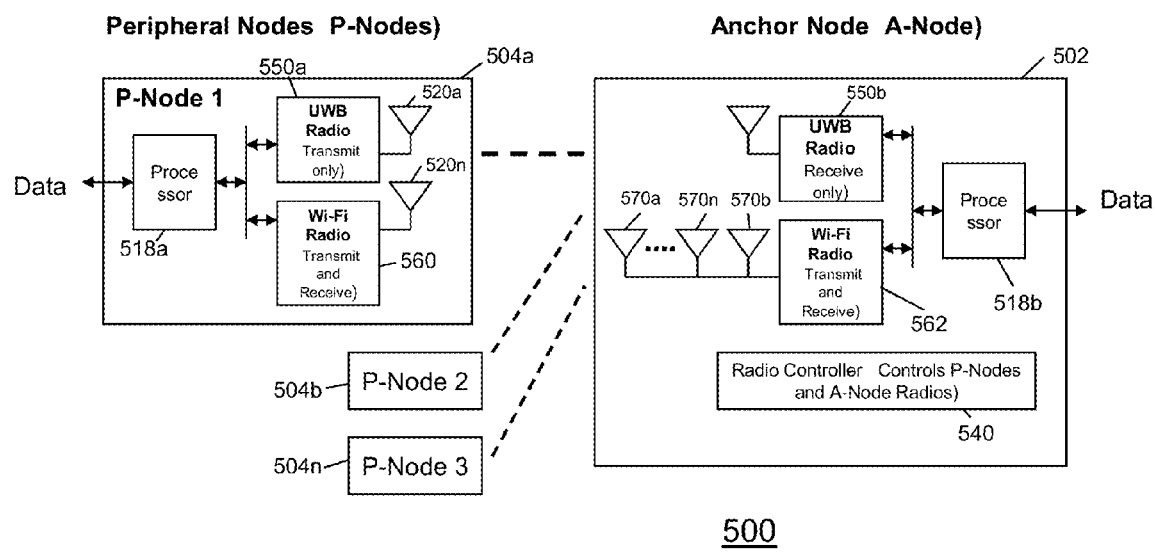
FIG. 7 illustrates a multi-radio system in accordance with an embodiment. Multiple antennas can be used for the Wi-Fi radio of the A-Node to increase robustness.

The multi-radio system embodied in FIG. 7 exemplifies another optimized solution for many current and emerging applications. As shown, the system employs a UWB transmitter 550a on the P-Nodes 504a-n and corresponding UWB receiver 550b on the A-Node 502. The UWB transmitter 550a and receiver 550b can be asymmetrical. Typically, the UWB transmitter 550a section can be built in a small silicon area and dissipates low power. The UWB receiver 550b has a more complex silicon implementation and dissipates higher power than the corresponding transmitter 550a. In target applications, P-Nodes 504a-n mostly transmit the data to A-Nodes 502, and therefore mostly use this link. P-Nodes 504a-n also implement a Wi-Fi compatible radio 560 which is a NB radio. There is corresponding Wi-Fi radio 562 on A-Node 502 for communication with P-Nodes 504a-n. The Wi-Fi radios 560 and 562 can use one or more modes of the Wi-Fi standard—802.11, 802.11b, 802.11g, 802.11a, etc. The Wi-Fi radios 560 and 562 can be used for communication in at least the following circumstances:

When P-Nodes 504a-n move out of the range covered by UWB radio 550a/550b.

If UWB radio 550a/550b suffers an outage due to some other reason.

When A-Node 502 transmits data to P-Nodes 504a-n (assumed to be infrequent for target applications).

On demand wherein an application can force the use of Wi-Fi radio 560/562.

Unlike the UWB transmitter 550a and UWB receiver 550b, the NB transmitter 560 and receiver 562 can be symmetrical. Their silicon area and power dissipation are comparable for both transmit and receive functions, and both transmit and receive functions take modest amount of silicon area and dissipate modest power. The use of Wi-Fi radio 560 and 562 as a NB radio results in an additional advantage: by making the system compatible with Wi-Fi standard based devices, the P-Nodes 504a-n and A-Nodes 502 can communicate with other Wi-Fi enabled devices.

The Wi-Fi radio can be further enhanced, if needed, by using multiple antennas 570a-n on the Wi-Fi radio of the A-Node 502. The corresponding Wi-Fi radio of the P-Node 504a-n can use a single antenna to reduce complexity. Through multiple antennas processing gain, the Wi-Fi link is more robust with a larger range. The multiple antenna configuration can thereby increase the system reliability and robustness at no additional complexity to the P-Nodes 504a-n. Although the complexity, cost and power of the A-Nodes 502 increase when using multiple antenna processing, in many embodiments, this is not a sensitive issue in the targeted OAW systems.

In embodiments using complementary radios in a communication system, two methodologies are employed: where only one radio is active at a time, which will be referred to hereinafter as the "Unicast" methodology; and where two or more complementary radios are active at the same time, referred to hereinafter as the "Simulcast" methodology. The following describes the feature of these methodologies in more detail.

(a) Unicast Methodology

The unicast methodology includes initial radio selection, whereby a radio is chosen from multiple radios to initiate a new connection between two devices, and radio switching, whereby one radio is switched to another during the course of a connection. It is also feasible for the unicast methodology to consist solely of initial radio selection or solely of radio switching. When the unicast methodology consists solely of radio switching, the initial radio to be used for a new connection can be chosen by any of a number of means, e.g., random selection, user or factory configuration, or in accordance with a default setting, or others. The following sections describe initial radio selection and radio switching in more detail.

(i) Initial Radio Selection

The method for initially selecting a radio for a new connection depends on the performance objective. The performance objective may be hardwired or user-programmable. Example performance objectives are described in the following sections.

(1) Minimal Power Consumption

In one embodiment, the objective is to minimize power consumption, and the initial choice of radio depends on the different radio structures. For example, a multi-radio device may include a narrowband (NB) radio and an ultra-wideband (UWB) radio as described herein. The RF and baseband circuitry implementing the UWB radio may operate with lower transmission power than the narrowband radio. Accordingly, one would choose UWB, the radio with lower transmit power, for initiating the connection.

(2) Minimal Interference to Other Devices

In another embodiment, the objective may be to minimize the interference caused by the new connection to other devices sharing the radio spectrum. In one embodiment, the initial choice of radio is based on the differences in radio structures. Consider a multi-radio device comprising a NB radio and a UWB radio. If NB radio devices sharing a common air interface standard are the sole users of the radio spectrum (as a result of government regulation, for example), and the air interface provides for cooperative channel partitioning, then the NB radio is preferred for initiating a new connection.

In some embodiments, however, the devices sharing the radio spectrum may not be cooperative or even known a priori. In this situation, a UWB radio offers the advantage of having a very low radiated power spectral density—potentially below the thermal noise floor—and hence would be the preferred initial radio.

In an alternate embodiment, measurements of the radio environment experienced by each radio can be used to predict the amount of interference introduced. Consider a system consisting of a mobile device and a base station, wherein the base station to mobile connection comprises the downlink connection and the mobile to base station connection comprises the uplink connection. At the base station, one measures the power spectral density (PSD) over the spectrum range corresponding to each radio. The received power for a radio then serves as a predictor of the interference from the new downlink connection on existing users for that radio. The lower the received power for a radio, the less interference the corresponding downlink is likely to produce.

Similarly, at the mobile device, the power spectral density is measured over the spectrum range corresponding to each radio. The received power for each radio at the mobile device is a predictor of the interference from the new uplink connection on existing users for that radio.

As an alternative to measuring the power spectral density over the spectrum range, the received background noise and interference power level can be measured individually on each channel of the radio spectrum. This can be done at either of the two communicating devices. To perform the tests on the different radios and different radio channels, quiet periods or quiet intervals—intervals during which all the devices do not transmit—can be used. For example, such quiet periods are described as part of the 802.11 protocol specification.

In some embodiments, the initial radio is selected to minimize downlink interference or uplink interference. In other embodiments, the radio is selected to minimize an aggregate of both uplink and downlink interferences. For this approach, the power received on the uplink and downlink for each radio are aggregated, and the radio with the lowest aggregate received power is selected. For example, the mobile device may communicate the downlink interference estimates to the base station over a control channel; the base station can aggregate the uplink and downlink interference for each radio and select an appropriate radio.

In another embodiment, the communications system is capable of using one radio for the downlink communication and optionally a different radio for the uplink communication. In this system, the system need not aggregate the uplink and downlink interference estimates to perform radio selection. Instead, the downlink radio can be chosen to minimize the downlink interference, and the uplink radio can be chosen to minimize the uplink interference.

(3) Maximal Reliability of New Connection

In some embodiments, the most important objective is not to minimize interference to other devices, but rather to maximize the reliability of the new connection. To accomplish this, the signal quality of the communications for each candidate radio can be estimated or predicted. In one embodiment, the communications protocol allows for each radio to transmit a pilot signal on the downlink, the uplink, or optionally both links. The pilot signal may include, e.g., a sequence of symbols or data bits. Alternatively, the signal quality can be measured directly from the symbols or data bits of the control signals or data signals that are ordinarily transmitted during the course of communication. This latter approach has the advantages of not using the additional radio bandwidth required by the pilot signal approach for signal quality estimation, and is more amenable to backward compatibility with existing radio standards. On the uplink, the base station receiver measures the signal quality for each radio using a signal quality estimator, which will be described shortly. Likewise, the mobile receiver measures the signal quality of each radio on the downlink. The radio is chosen with the best uplink signal quality or the best downlink signal quality.

In some embodiments, the radio may be chosen based on both uplink and downlink signal quality predictors. The appropriate radio can be chosen by aggregating the signal quality statistics together at the communications device that performs the radio selection. There are several ways of accomplishing this aggregation of signal quality characteristics. For example, the mobile device can communicate the downlink signal quality estimates to the base station over a control channel. The base station can then compute a score for each radio as the lesser of its uplink quality and its downlink quality, and can select the radio with the highest score. Alternatively, the base station may narrow the field to only those radios whose uplink and downlink signal quality exceed a minimum threshold. From this group, the base station then selects the radio that maximizes downlink signal quality or uplink quality.

In a further embodiment, the communications system uses one radio for the downlink communication and optionally a different radio for the uplink communication. In this system, there is no need to aggregate the uplink and downlink signal quality predictors to perform radio selection. Instead, the system can choose the downlink radio with the maximum downlink signal quality predictor, and chooses the uplink radio with the maximum uplink signal quality predictor.

(4) Support Uplink and Downlink Bandwidth Disparities

In some embodiments, there may be a large disparity in the downlink and uplink data rates. For example, in a mobile Web access application, the mobile device spends a large fraction of time downloading Web content after clicking on http hyperlinks. Such usage patterns results in large amounts of data being sent on the downlink but little data transmitted on the uplink. We accommodate this disparity in uplink and downlink bandwidths with a communications system capable of using one radio for the downlink communication and optionally a different radio for the uplink communication; for example, selecting the UWB radio for the downlink and the NB radio for the uplink.

(ii) Signal Quality Estimation

As described above, several of the methods require an estimate of the signal quality. There are many possible methods of estimating signal quality. In one embodiment, the signal quality can be estimated as the received signal strength indicator (RSSI). In another embodiment, the signal quality can be estimated as the packet error rate or bit error rate. In another embodiment, the signal quality can be estimated by monitoring the background noise and interference level of the link; the higher the background noise and interference level, the lower the quality of the link. Another embodiment for estimating the signal quality is:

$$\text{Estimated signal quality} = \|s\|^2/\|s-\|s\|^2/\|d\|^2 * d\|^2,$$

where s is the received signal vector immediately prior to decision slicing, d is a known pilot vector of symbols, and $\|.\|$ denotes the norm of a vector. The received signal vector and the pilot vector have the same prescribed number of symbols. Typically, 20 or more symbols are sufficient, and more symbol generate a more accurate signal quality estimate. Alternatively, in the absence of known pilot symbols, as would be the case if signal quality estimation is performed directly on the data or control signal, a decision-directed approach can be used to derive d. In this case, d is the vector of detected symbols after decision slicing.

(iii) Multiple Performance Objectives

The preceding embodiments described procedures that allow a multi-radio communications system to meet individual performance objectives. In other embodiments, a multi-radio communications system can allow for simultaneously achieving multiple performance objectives using a constrained optimization approach.

It may not be possible to select a radio that is optimal for every objective. For example, a radio that is optimal for communications reliability may have suboptimal power consumption. In some embodiments, such a system considers one objective from various objectives to have the greatest importance; hereinafter referred to as the primary objective. For each of the remaining objectives, a threshold of acceptable performance is set; hereinafter referred to as the performance constraint. The constrained optimization approach can be described by the following: find the radio that optimizes the primary objective, subject to the performance constraint being met for the other objectives.

Figure 8:
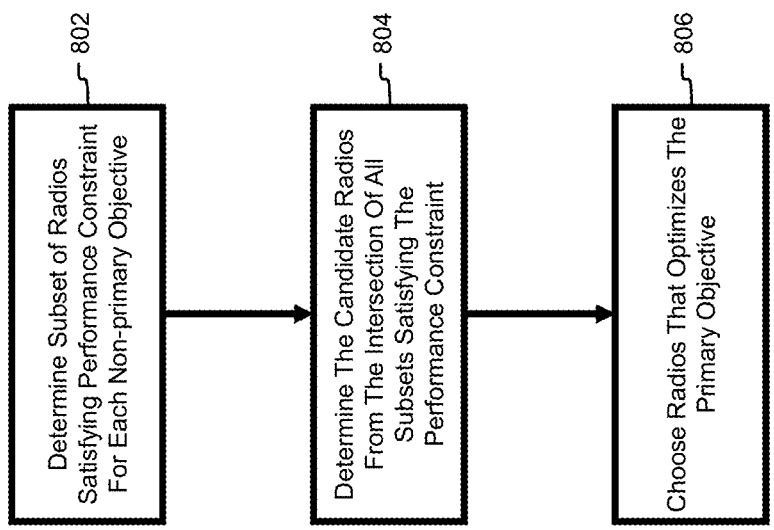
FIG. 8 illustrates a flow chart for addressing the constrained optimization approach.

FIG. 8 shows a flow chart for addressing the constrained optimization approach. Referring to the FIG. 8, for each non-primary objective, determine the subset of radios satisfying the performance constraint, via step 802. Depending on the non-primary objective, methods for executing step 802 are described above for the Unicast Method to minimize power consumption, minimize interference to other devices, maximize reliability of new connection, or support uplink and downlink bandwidth disparities.

Next, take the intersection of all subsets derived from the previous step to determine the candidate set of radios, via step 804. Finally, from the candidate set of radios, choose the radio that optimizes the primary objective, via step 806. Methods for executing step 806 given the primary objecting are also described herein.

In an example embodiment, suppose the primary objective is to minimize interference, subject to achieving a minimum signal quality, in a dual-radio system comprising a narrowband (NB) radio and an ultra-wideband (UWB) radio. First, procedures described herein can be applied to estimate the signal quality for both the narrowband and UWB radios, and determine a candidate set of radios with acceptable signal quality. If both radios meet the performance constraint, then a procedure can be used to pick the radio that minimizes interference. If only one radio meets the performance constraint, that radio can be chosen. If neither radio meets the constraints, the constraints can be relaxed to find a feasible solution.

(b) Simulcast Method

In the simulcast method, both radios are active at the same time. Both radios simultaneously transmit, and the receiver combines the signals from both radios. Several uses are envisioned for this method. For example, when switching from one radio to another, the simulcast method can help ensure that the connection remains throughout the switch so that there is no outage; i.e., it provides soft handoff or make-before-break switching between the two complementary radios. Alternately, when reliable communications are of paramount importance, both radios can transmit simultaneously all the time. The simulcast method is effectively an advanced form of radio diversity, which can be exploited by the receiver.

In one embodiment, two complementary radios use the same symbol constellation alphabet for encoding data, e.g., Binary Phase-Shift Keying (BPSK), and the signals from the two radios can be combined in baseband. There are many ways to perform the combining. In one embodiment, the signal from each radio undergoes its normal receive processing (down conversion from RF to baseband, amplification, sampling and equalization/matched filtering), except that in the final stage before slicing, the baseband signal of each radio path immediately prior to slicing are summed together, and the combined signal goes to a single slicer. In an alternate embodiment, an enhanced form of RAKE reception is used:

$$\text{Input to slicer} = c_{1,1}*x_1[1] + \ldots + c_{1,n}*x_1[n] + c_{2,1}*x_2[1] + \ldots + c_{2,m}*x_2[m]$$

$c_{i,j}$=the j-th tap, or coefficient, of the RAKE filter for radio i $x_i[j]$=the j-th time sample of baseband signal of radio i A RAKE receiver is a radio receiver designed to counter the effects of multipath fading by using several sub-receivers called fingers, wherein each finger independently decodes a single multipath component that are later combined in order to make the most use of the different transmission characteristics of each transmission path. The taps of the RAKE filter can be derived for each of the complementary radios using any of a number of methods known in the art; for example, maximum ratio combining (MRC) or optimizing for minimum mean square error (MMSE). The time between successive taps and between successive baseband signal samples may be the symbol period, or it may be a fraction of the symbol period, in the case of Nyquist sampling or over-sampling.

Combining of the signals from the two radios before slicing can improve the reliability of the communications, providing robustness against channel impairments in one or both of the radio paths.

VI. Robust Radio Switching Protocols

Radio switching is the process of changing from one radio to another after a connection is established in order to improve on one or more performance objectives for the connection.

(a) Radio Switching

In one embodiment, the steps for radio switching comprise the following:

Step 1:

For each performance objective of interest, set a threshold of acceptable performance objectives and monitor each performance objective for the current radio using methods as described herein. For example, if the performance objective is minimizing interference, monitoring of interference can be performed. If reliability is the performance objective, the signal quality can be estimated for the current radio. If both reliability and interference objectives are of interest, monitor the predictors for both objectives for the current radio;

Step 2:

If there is only one performance objective and its measured performance metric falls below the acceptable threshold, switch to an alternate radio. If there are multiple performance objectives, switch to an alternate radio based on one of the following criteria: (i) if any one performance objective is not met; (ii) if all performance objectives are not met; or (iii) if the primary performance objective is not met. If there are more than one alternate radios to choose from, then the optimal radio can be selected using any one of the methods outlined herein; and Step 3:

After switching, optionally return to Step 1.

In an alternate embodiment, the performance objective is continuously or periodically monitored for some or all of the radios, e.g., monitoring for the best signal quality, the lowest interference or a combination of performance objectives. If the current radio is not the optimal radio, then switch to the optimal radio. If there is only one performance objective and if the performance metric of at least one alternate radio exceeds that of the present radio by some prescribed amount, then switch to the best alternate radio. If there are multiple performance objectives, switch to an alternate radio if (i) a majority or all of the performance metrics of at least one alternate radio exceed those of the present radio by some prescribed amount; or (ii) the primary performance metric of at least one alternate radio exceeds that of the present radio by some prescribed amount.

(b) Handshaking Protocols

As stated earlier, a performance objective of the communications system can be increased reliability. Hence, when communication using one radio experiences poor quality, excessive radio interference or other impairments, it can be desirable to switch to an alternate radio. However, the control signal messages that direct the overall communications may be transmitted on the same poor quality communications channel as the data. A problem is how to signal the radio switching reliably, since the radio switching is needed precisely when the communications channel is experiencing poor quality. If the control signaling is not done correctly, the transmitter and the receiver may end up in a state where they are not in agreement as to which radio to use, resulting in a broken communications link. The present invention discloses a communications protocol method which can ensure highly reliable switching from one radio to another, even if the communications channel over which the control messages are transmitted is unreliable.

In many practical systems, the two wireless devices communicating with each other differ in the amount of power available to them. For example, in a cellular telephony application, a cellular phone generally communicates with a base station. The base station is fixed in location and connected to the power grid, so it does not have the power limitations imposed upon a battery-powered cellular phone. This difference in the amount of available power is not limited to whether the device is portable or stationary.

The cellular phone may comprise a SmartPhone. Although there is no standard definition of a SmartPhone, such a device is generally a cellular phone offering advanced capabilities, including but not limited to Electronic Mail (E-mail) and Internet capabilities. A SmartPhone can be thought of as a mini-computer offering cellular phone services. SmartPhones commonly use operating systems (OS) including the iPhone OS from Apple, Inc., the RIM Blackberry OS, the Palm OS from PalmSource, and the Windows Mobile OS from Microsoft, Inc. Other operating systems can be used.

For example, in a medical sensor network, a sensor device may be placed on the body to collect physiological data, and then wirelessly communicate the data to a SmartPhone. Both devices are portable and require self-contained power sources, but the sensor device may have a smaller form factor and be constrained to run on a smaller battery than the SmartPhone. The sensor device may be designed to be disposable and supplied with a cheap, low capacity battery, whereas the SmartPhone is a reusable device designed with a more expensive, higher capacity battery. In summary, there may be a disparity in the energy capacities of two devices communicating over a wireless link because of differences in their mobility (stationary versus portable), physical size and cost.

Because processing power is proportional to energy usage, it can be desirable to design the communications protocol for radio switching to have low compute processing requirements. However, if the switching protocol is asymmetric, and designed to support different amounts of compute processing at different radio nodes, then radios with lower power capacity can conserve energy by doing less processing, while higher power capacity radios will do more processing.

The communications protocol method of the present invention is applicable to point-to-point as well as multiple access systems. As described herein, the dynamic radio switching can be integrated together with the selection of which radio channel to use. The partitioning of radio spectrum into channels can be accomplished by frequency band partitioning, by time slot partitioning, by the use of frequency hopping sequences, direct sequence spreading codes, pulse position offsets, pulse position hopping, or by other means.

The following embodiments exemplify approaches to switching between a base node device and a peripheral node. In some embodiments, the base node consumes more resources than the peripheral node or nodes. For example, as illustrated in the following embodiments, the base node can comprise a high-powered device (HPD) and the peripheral node or nodes can comprise low powered devices (LPD). A specific embodiment comprises the cell phone and cell tower arrangement as described above. Those of ordinary skill in the art will appreciate that the following protocols readily generalize to alternate embodiments, e.g., where the two devices in communication are of similar power capacity.

Figure 9:
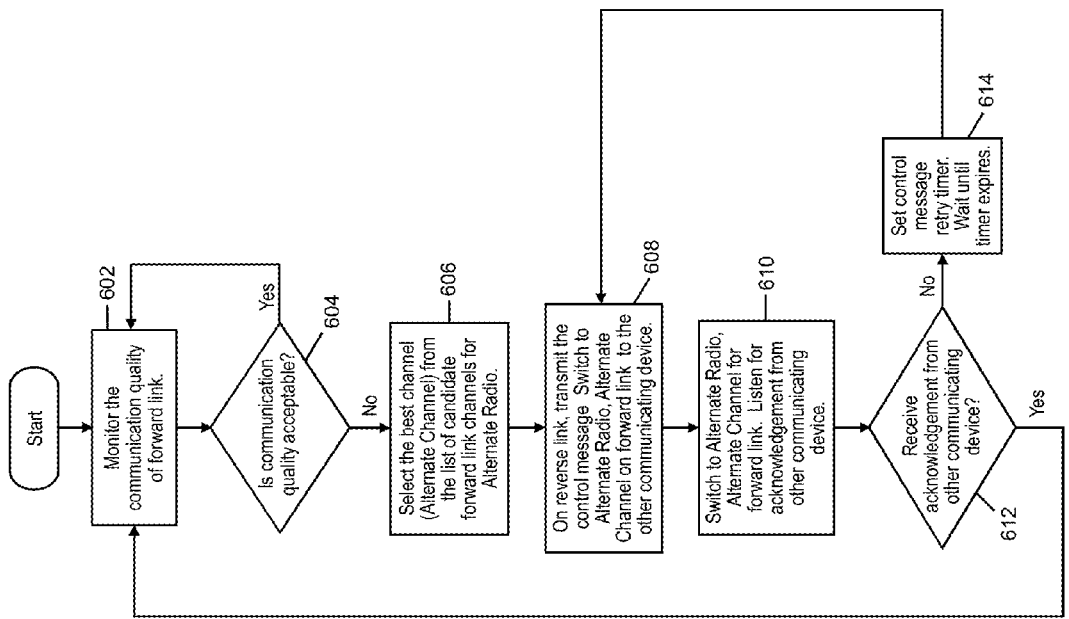
FIG. 9 illustrates an approach for reliably switching radio connections on a base node.
Figure 10:
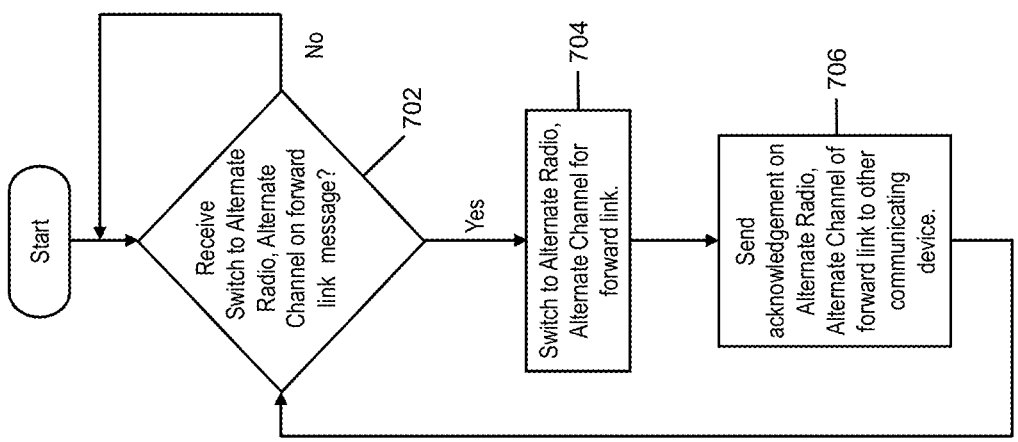
FIG. 10 illustrates an approach for reliably switching radio connections on a peripheral node in communication with the base node of FIG. 9.

FIGS. 9 and 10 depict one embodiment of the communication protocol method for a HPD and a LPD, respectively. The forward link is the communication link from the LPD to HPD, and the reverse link is the communications link from the HPD to the LPD. The HPD monitors the communications quality of the forward link on the Current Channel of the Current Radio (step 602), as described above. The HPD determines whether the communication quality is acceptable (step 604). If the communication quality becomes unacceptable, it then selects a best Alternate Channel and a best Alternate Radio (step 606). The HPD then transmits a control message on the reverse link to the LPD, indicating the Alternate Channel and the Alternate Radio to switch to (step 608). The HPD then switches to the Alternate Channel and Alternate Radio (step 610). It listens on this new channel and radio for an acknowledgement message from the LPD indicating that it had received the message to switch to the Alternate Radio and Alternate Channel, as well as for any data communication from the LPD (step 610). Verification that the message is a valid acknowledgement or a valid data packet can be accomplished using by a number of ways; for example, by use of a cyclic redundancy check or a checksum. By listening for the acknowledgement on the new Alternate Channel of the Alternate Radio (step 612), the communications of the acknowledgement avoids using the already impaired Current Channel of the Current Radio. If the HPD does not receive an acknowledgement within a prescribed time interval, it will retransmit the control message to switch to the Alternate Radio and Alternate Channel (step 614). Optionally (not shown in FIG. 9), the HPD may re-evaluate the candidate channels of the candidate radios to select a new best Alternate Radio and Alternate Channel. The HPD will then periodically retransmit the control message to switch to the Alternate Radio and Alternate Channel until it receives an acknowledgement from the LPD. Once the acknowledgement is received, the switch to the new Alternate Channel of the Alternate Radio by the HPD and LPD is complete and the HPD returns to monitoring the forward link (step 602).

In contrast with the operation of the HPD, the steps in the communications protocol taken by the LPD (shown in FIG. 10) are computationally relatively simple. If the LPD receives a control signal message on the Current Channel of the Current Radio from the HPD indicating that that it should switch (step 702), the LPD will switch to the specified Alternate Channel of the Alternate Radio (step 704). It then sends an acknowledgement to the HPD on the Alternate Channel of the Alternate Radio, indicating that it received the message to switch (step 706). It then uses the Alternate Channel of the Alternate Radio for subsequent data transmission on the forward link.

Figure 11:
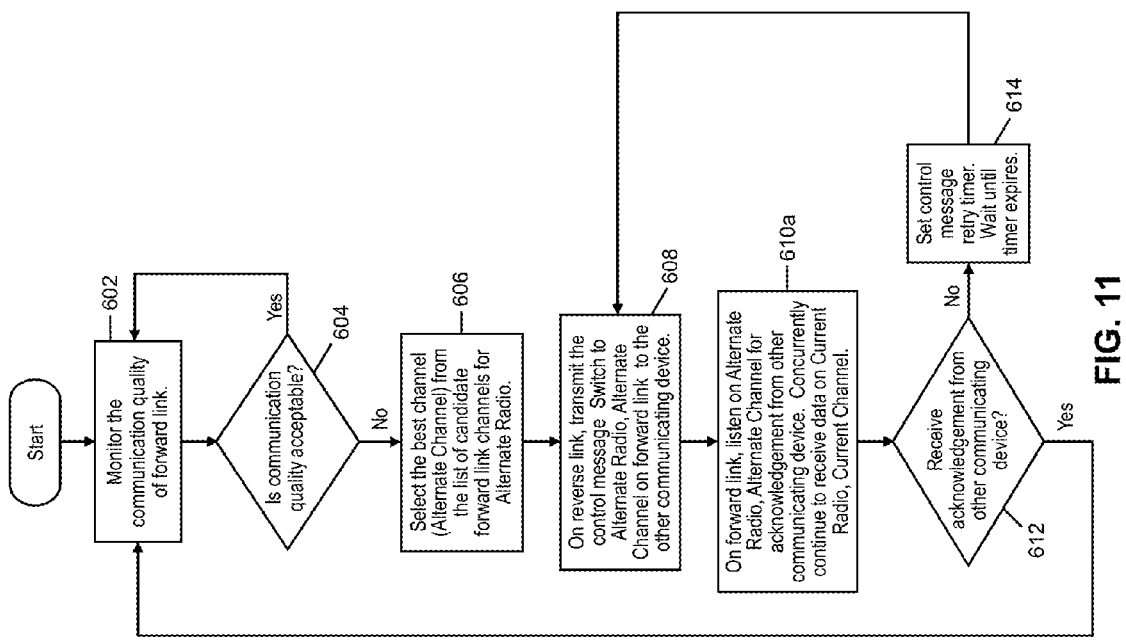
FIG. 11 illustrates a modification to FIG. 9 for reliably switching radio connections on a base node.

In a related embodiment, the operation of the communication protocol is depicted in FIG. 11 for the HPD. The HPD monitors the communications quality of the forward link on the Current Channel of the Current Radio (step 602). The HPD determines whether the communication quality is acceptable (step 604). If the communication quality becomes unacceptable, the HPD selects a best Alternate Channel and best Alternate Radio (step 606), and then transmits the control message "Switch to the Alternate Channel and Alternate Radio on the forward link" to the LPD (step 608). As before, it then listens on the Alternate Channel of the Alternate Radio for an acknowledgement from the LPD (step 610*a*); however, the HPD will concurrently continue to receive data from the LPD on the Current Channel of the Current Radio until it receives an acknowledgement from the LPD on the Alternate Channel of the Alternate Radio (step 610*a*). This method introduces additional complexity to the HPD, but has the advantage of minimizing potential lapse or dead time in data communications during the radio switch.

Figure 12:
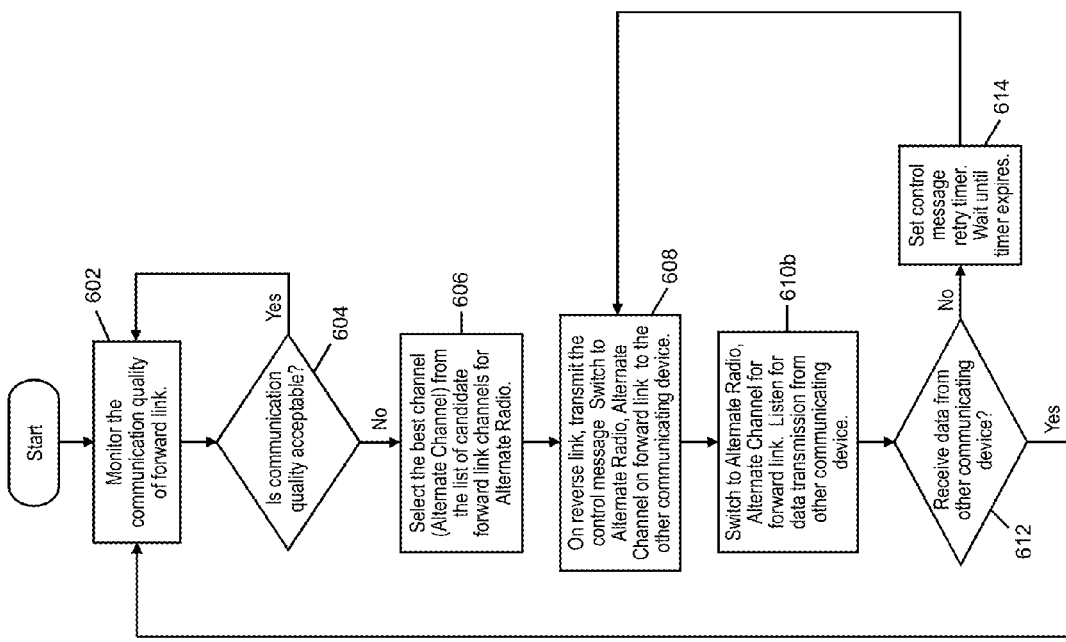
FIG. 12 illustrates an alternate approach for reliably switching radio connections on a base node.
Figure 13:
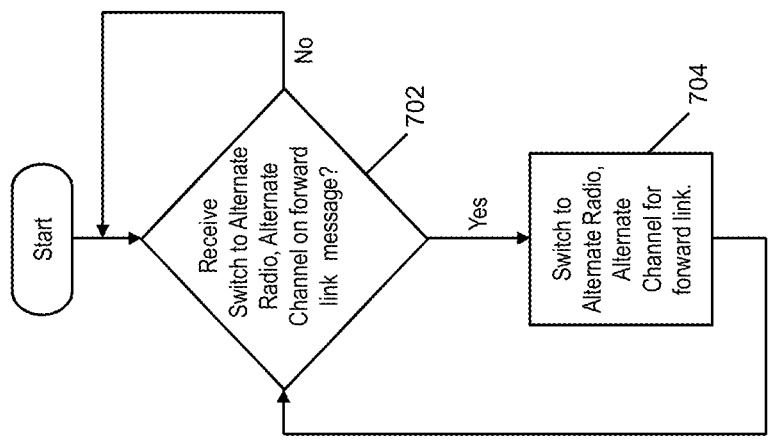
FIG. 13 illustrates an approach for reliably switching radio connections on a peripheral node in communication with the base node of FIG. 12.

In another embodiment, FIGS. 12 and 13 depict the operation of the communication protocol method for the HPD and the LPD, respectively. As before, the HPD monitors the communications quality of the forward link on the Current Channel of the Current Radio (step 602). The HPD determines whether the communication quality is acceptable (step 604). If the communication quality becomes unacceptable, the HPD selects a best Alternate Channel and best Alternate Radio (step 606), and then transmits the control message "Switch to the Alternate Channel and Alternate Radio" to the LPD (step 608). It then switches to the Alternate Channel, Alternate Radio (step 610*b*) for the forward link. It listens on this new channel and radio for data communication from the LPD, but does not wait for an acknowledgement from the LPD (step 610*b*). Instead, the HPD will periodically retransmit the message "Switch to Alternate Radio, Alternate Channel on forward link" to the LPD until it receives data on the new channel and radio. The switch to the new Alternate Channel of the Alternate Radio by the HPD is complete once the HPD begins receiving data on the new channel and radio (step 612*a*). As shown in FIG. 13, the corresponding operation required by the LPD is very simple: when it receives a control message instructing it to switch (step 702), the LPD will switch to the specified Alternate Radio, Alternate Channel on the forward link, and perform subsequent data transmission on the new channel and radio (step 704). This embodiment has the advantage of a simplified communication protocol for both the HPD and the LPD, and is particularly suitable in applications where data is sent either continuously or at frequent, regular intervals on the forward link.

Figure 14:
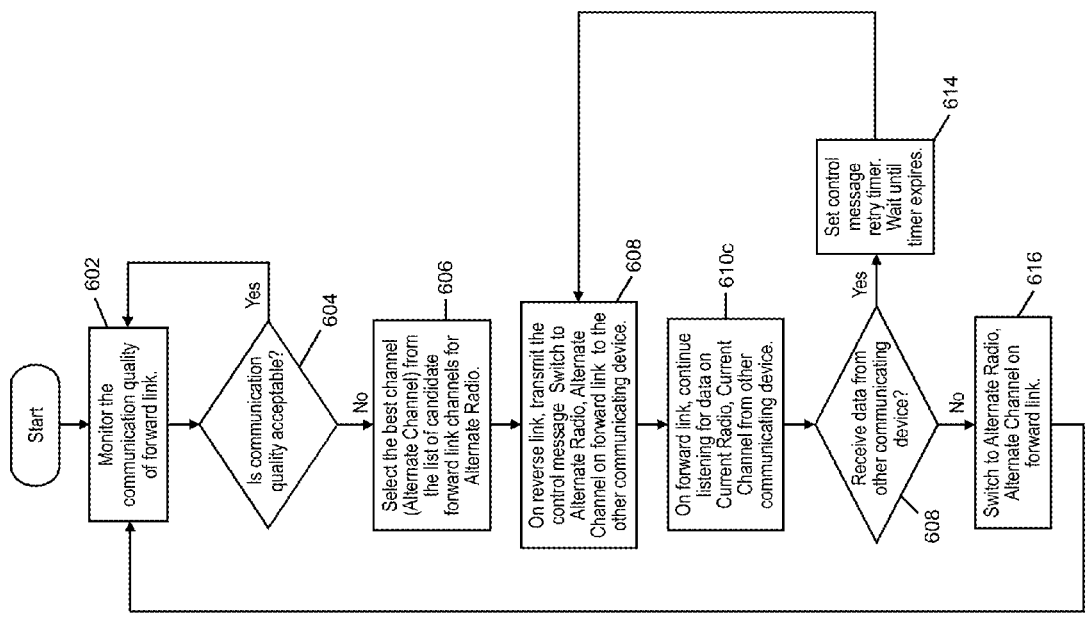
FIG. 14 illustrates a modification to FIG. 12 for reliably switching radio connections on a base node.

FIG. 14 depicts the operation of the HPD in a variation of the aforementioned method. As before, the HPD monitors the communications quality of the forward link on the Current Channel of the Current Radio (step 602). The HPD determines whether the communication quality is acceptable (step 604). If the communication quality becomes unacceptable, the HPD selects a best Alternate Channel and best Alternate Radio (step 606), and then transmits the control message "Switch to the Alternate Channel and Alternate Radio" to the LPD (step 608). The difference is that the HPD continues to listen on the Current Radio, Current Channel for data from LPD on the forward link (step 610*c*). As long as it continues to receive data on the current radio and channel (step 612*a*), the HPD will periodically retransmit the message "Switch to Alternate Radio, Alternate Channel on forward link" to the LPD (step 614). Once the HPD stops receiving data for a prescribed time interval on the current radio and channel, it then switches to the Alternate Radio and Alternate Channel for subsequent reception of data from the LPD (step 616). This method of operation is most suitable for applications where data is sent either continuously or at frequent, regular intervals on the forward link.

The previously described protocols can also be applied in the case where the roles of the HPD and the LPD are reversed; that is, the forward link is the communication link from the HPD to LPD, and the reverse link is the communications link from the LPD to the HPD. The LPD then monitors the communications quality of the forward link and initiates the radio switching. While this method of operation can be suboptimal in terms of matching the low processing complexity portion of the protocol with the LPD, it can still help ensure reliable radio switching if the quality of the communication link from the HPD to the LPD becomes poor. In an alternate embodiment, the LPD may make a request to the HPD to perform the monitoring and initiate the switching on the behalf of the LPD. This approach can be used when the LPD does not have sufficient computational and/or energy resources to perform the monitoring and radio switching.

Those of ordinary skill in the art will appreciate that the previously described protocols readily generalize to the case where the two devices communicating are of similar power capacity.

VII. Dual Mode Ultra-Wideband/Narrowband Reconfigurable Transceiver

A dual mode reconfigurable radio architecture can operate as a narrowband transceiver and is reconfigurable to operate as a broadband low power ultra-wideband transceiver.

(a) Generic Dual Mode Reconfigurable Receiver

Figure 15:
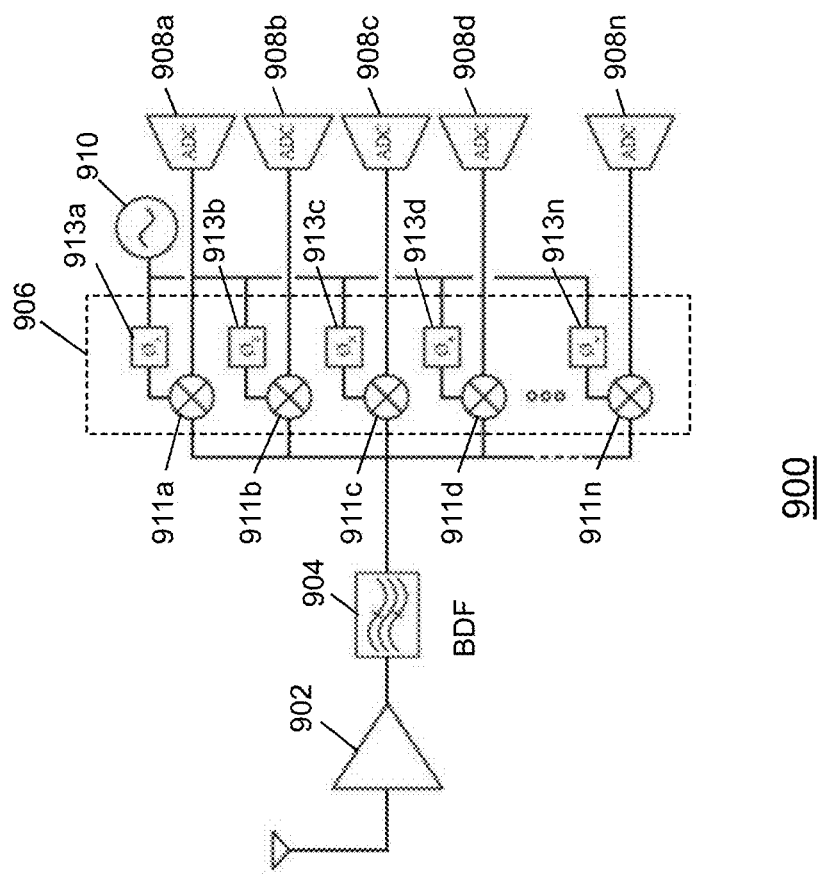
FIG. 15 illustrates a generic narrowband receiver.

FIG. 15 illustrates a generic narrowband receiver 900 comprising a low-noise amplifier (LNA) 902, a reconfigurable bandpass filter 904 (which is often realized as part of the LNA output tank), and a bank 906 of devices. In this embodiment, the bank of devices includes a plurality of mixers 911*a*-911*n*. Each of the mixers 911*a*-911*n* are driven with different phases 913*a*-913*n* of the Local Oscillator (LO) signal 910. The most common approach is to use two quadrature phases of the LO, or four differential quadrature phases. The output of these mixers is in turn filtered and sampled by analog-to-digital converter (ADC) 908*a*-908*n* (filter not shown).

Figure 16:
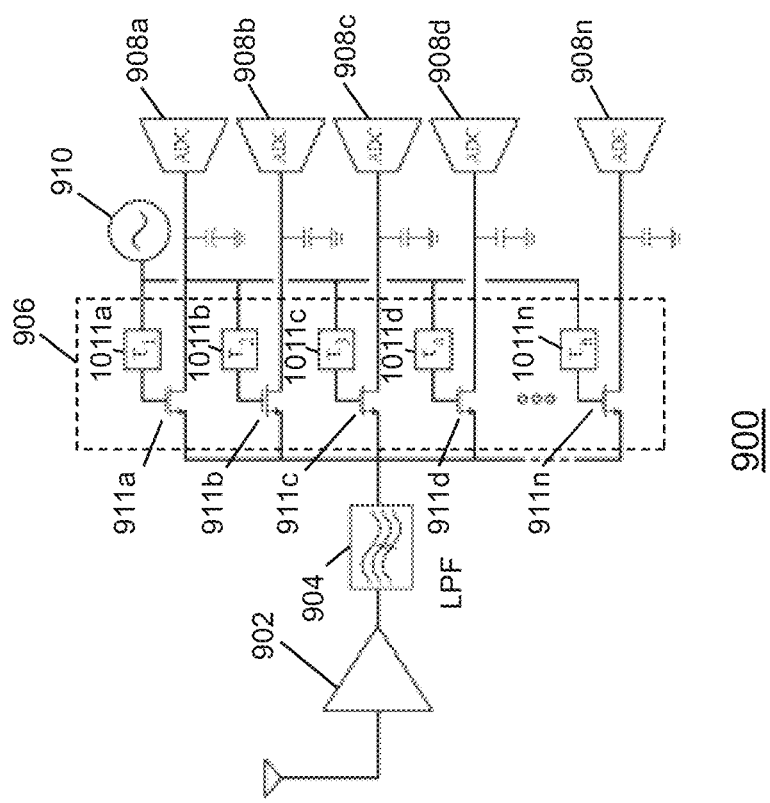
FIG. 16 illustrates the receiver configured into an ultra-wide band (UWB) receiver.

FIG. 16 illustrates the receiver configured into a wideband receiver by bypassing or reconfiguring the filter 904 to be a low pass filter (one technique to convert the RLC load into a shunt-peaked load is described later) and converting the mixers 906 into sampling switches 906. In Complementary Metal-Oxide Semiconductor (transistor type) (CMOS) technology this is easily done by re-using the existing devices 911*a*-911*n* (in for example, a Gilbert cell) as switches. The switches 911*a*-911*n* are now driven with a periodic square waveform delayed by time delays 1011*a*-1011*n* fractions of the period Ti—Tn in order to capture different instants of the waveform. The ADCs 908 are clocked at a slower rate, but in parallel ADCs 908 capture a wider bandwidth (bandwidth extension is equal to the number of stages in parallel). While signal-ended switches are shown, one of ordinary skill in the art readily recognizes that this feature extends to differential switches and to double-balanced switching architectures.

(b) Generic Dual Mode Reconfigurable Transmitter

Figure 17:
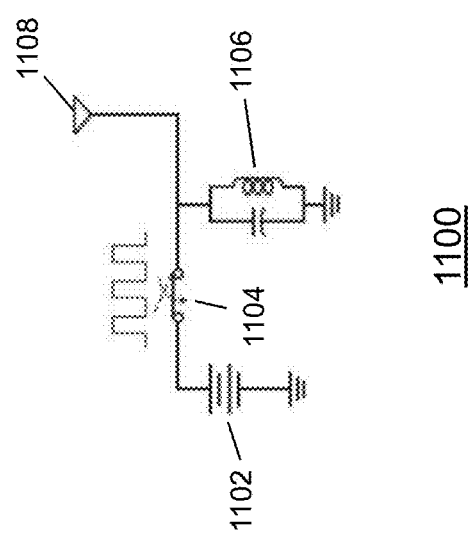
FIG. 17 illustrates a generic transmitter configured as a narrowband transmitter in accordance with the present invention.
Figure 18:
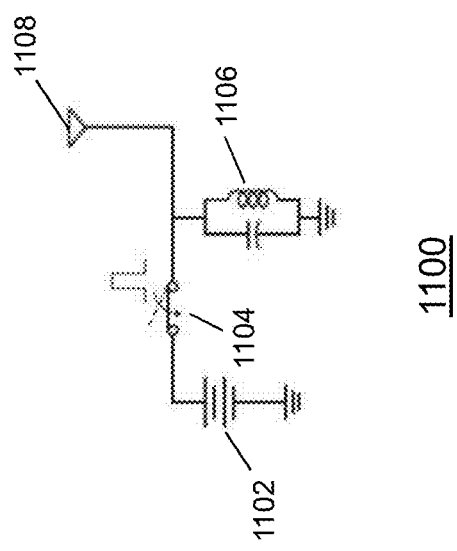
FIG. 18 shows that, when the transmitter is in UWB mode, a single pulse to a switch is provided such that a single transmitter can be easily reconfigured into either a narrowband or a UWB mode.
Figure 19:
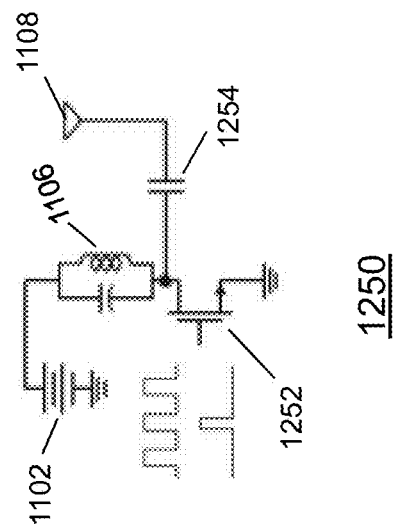
FIG. 19 illustrates an embodiment of a circuit which can provide either narrowband or UWB mode dependent upon the input signal to the transistor.

FIG. 17 illustrates a generic transmitter 1100 configured as a narrowband transmitter in accordance with the present invention. The transmitter 1100 includes a power source 1102 coupled to a switch 1104. The switch 1104 is coupled to an inductor-capacitor (L-C) circuit 1106 and to an antenna 1108. The L/C circuit 1106 and the power source 1102 are coupled to the ground. When in the narrowband mode, the switch 1104 provides a periodic signal to the antenna. Phase or frequency modulation can be applied to the switch while the output power is controlled by the amplitude of the direct current (DC) power source. As seen in FIG. 18, when the transmitter is in UWB mode a single pulse to switch 1104 is provided. In so doing, it is seen that a single transmitter can be readily reconfigured into either a narrowband mode or a UWB mode. FIG. 19 illustrates an embodiment of a circuit 1250 which can provide either mode dependent upon the input signal to the transistor 1252.

(c) Dual Mode Reconfigurable Transceiver

Figure 20:
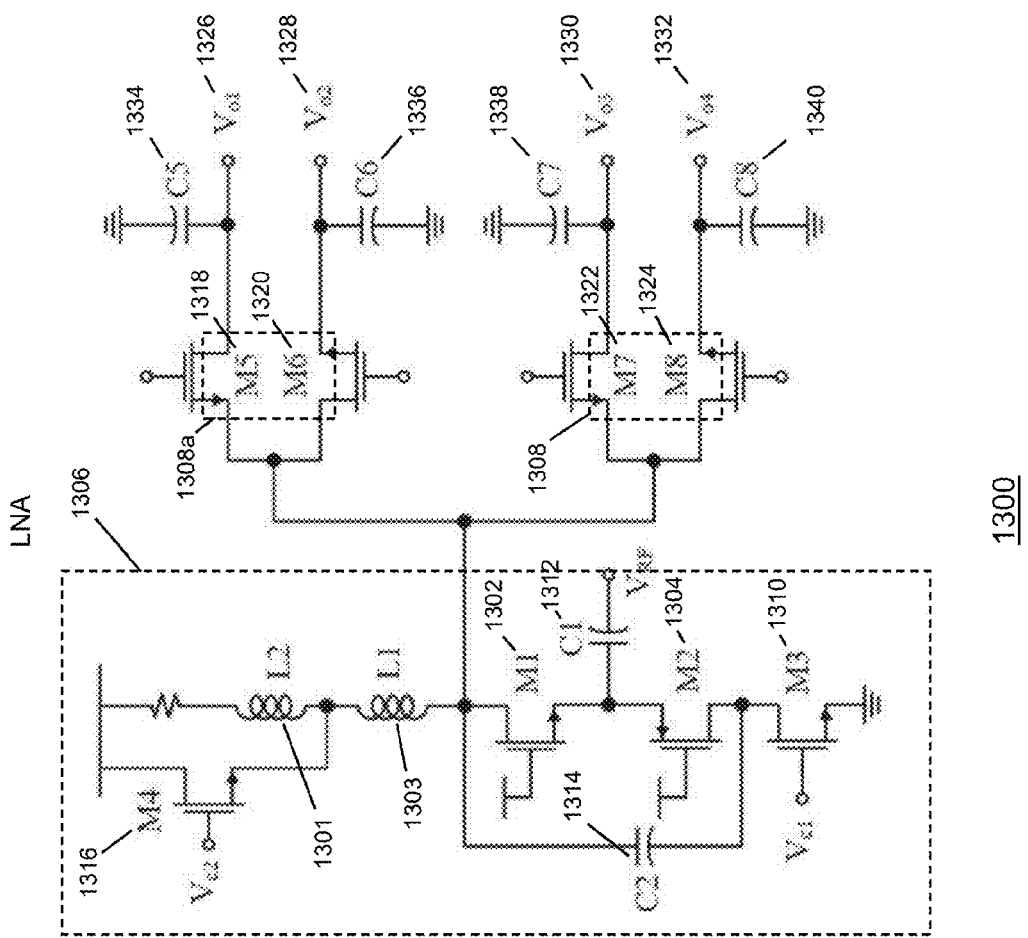
FIG. 20 illustrates the reconfigurable receiver implemented in CMOS technology.

A particular embodiment of dual mode reconfigurable transceiver is described in detail below. FIG. 20 illustrates the reconfigurable receiver 1300 implemented in CMOS technology. Transistors 1302/1304 comprise a complementary input stage low noise amplifier (LNA) 1306 with low impedance to match to the antenna. Transistor 1310 is a programmable current source which can alter the input match and LNA gain 1306 to adapt to varying conditions. Capacitor 1312 and capacitor 1314 are AC coupling capacitors, and capacitor 1314 couples the alternating current (AC) signal from transistor 1304 to transistor 1302, forming a current summation at the drain of transistor 1302. The load of the LNA 1306 is formed by a large low Q inductor, inductor 1301 and inductor 1303, which forms a peaking load.

Figure 21:
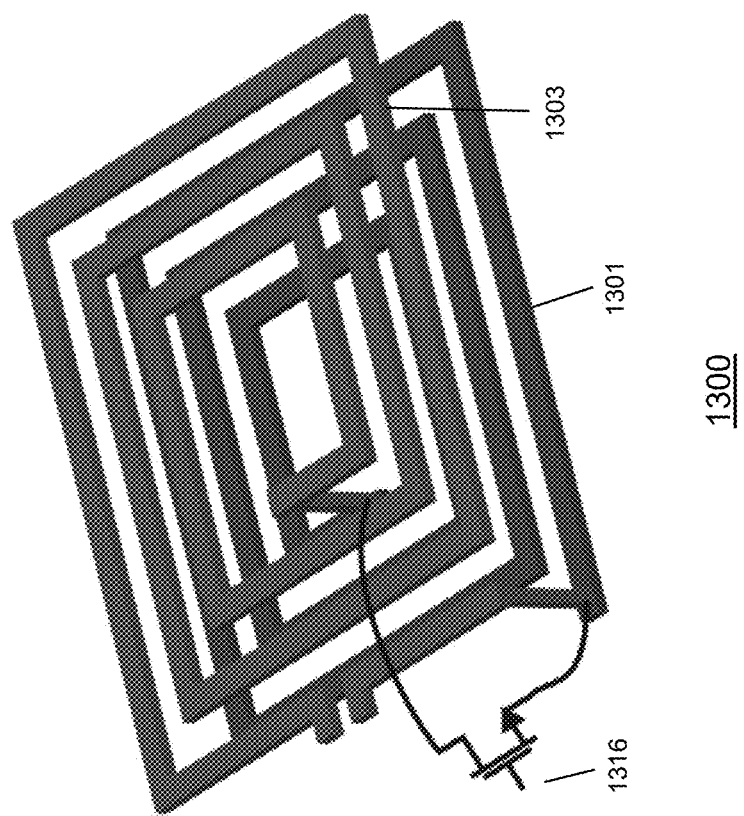
FIG. 21 shows the layout of the inductors in the present invention.

The layout of these inductors 1301 and 1303 is particularly important as shown in FIG. 21. This inductors are a stacked series connected structure, with spirals on each layer connected in series with lower metal layers with the correct orientation to increase the magnetic flux and hence to realize a large inductor. Referring back to FIG. 20, transistor 1316 is connected as a switch between the second layer and supply. A control signal on the gate of transistor 1316 can short out the bottom layer turns of the inductor. In this way, if transistor 1316 is off, then the load is large peaking load. The resistance of the load is made up of the bottom metal layers, which are typically thinner in an IC process. When transistor 1316 is turned on, the AC signal is bypassed to supply through transistor 1316 and the load is a small higher Q inductor, which resonates with the load of the LNA 1306. In this way, the LNA 1306 can be reconfigured from a broadband LNA for UWB to a narrowband LNA.

Referring back to FIG. 20, transistors 1318, 1320, 1322 and 1324 comprise the core of the mixer/sampler stage. Each transistor 1318-1324 is biased to operate with zero DC current as a passive switching mixer. In narrowband mode 1302, these transistors are driven with a local oscillator (LO) 1304 which drives the top pair of transistors 1318-1320 with an in-phase (I) 1308a differential signal, and the bottom pair of transistors 1322-1324 with a quadrature phase differential signal (Q) 1308. The outputs $V_{o1}$ 1326-$V_{o2}$ 1328 are a differential IF output signal for the I 1308a channel and the outputs $V_{o3}$ 1330-$V_{o4}$ 1332 are a differential IF signal for the Q 1308 channel. Since the IF load is capacitive and low pass, the effective load of the mixer seen by the LNA 1316 is time-varying and can be shown to effectively form a resonant tank which provides additional rejection of out of band interference.

In ultra-wideband mode, each transistor/capacitor combination (transistor 1318 and capacitor 1334, transistor 1320 and capacitor 1336, transistor 1322 and capacitor 1338, and transistor 1324 and capacitor 1340) forms a sample-and-hold circuit (for example, transistor 1318 and capacitor 1334) which samples the RF signal directly on the capacitor (capacitors 1334-1340). Each capacitor (capacitors 1334-1340) is sized large enough so that the sampled kT/C noise meets the system specifications. The transistor 1318 is thus biased large enough to provide the bandwidth requirements of the system. The gate of transistor 1318 is driven with a clock signal at sampling instant T1 while the clock of transistor 1320, transistor 1322 and transistor 1324 are sampled at instants T1+Δd, T1+2Δd, T1+3 Δd. In this way the bandwidth requirement of each sampler is reduced by one quarter and four parallel streams of data are used to capture the signal. The output of each sampler is amplified by a switched capacitor circuit and then digitized by the ADC. Alternatively, this sampler can form the core of a Delta-Sigma to capture the signal in the digital domain.

The operation of the circuit can be enhanced by placing a VGA in the receiver path. The VGA forms the second stage of amplification following the LNA. To accommodate both narrowband and broadband modes, the VGA can operate up to the highest RF frequency in the UWB mode. To save power in narrowband mode, however, the VGA can be re-wired and connected after the mixers where the highest frequency of operation is set by the IF and not the RF signal. The current of the VGA stage is lowered to lower the bandwidth of the mixer.

Figure 22A:
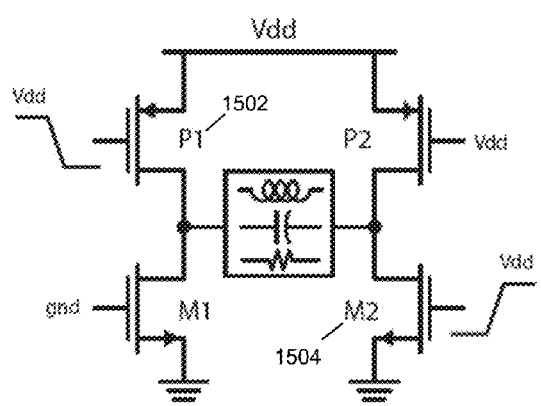
FIGS. 22A and 22B show the operation of the reconfigurable transmitter in more detail.
Figure 22B:
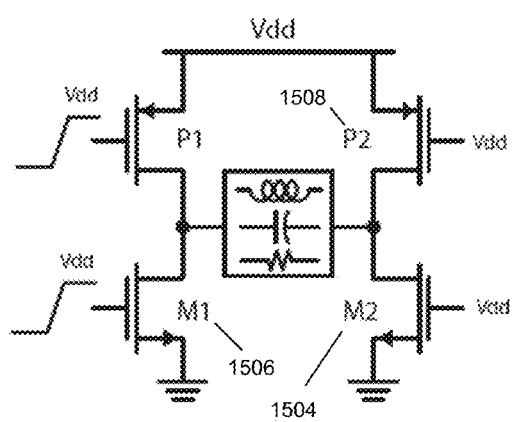

The most commonly used UWB transmitter circuit includes a H-bridge structure where the gate of the transistors are driven with the correct signals as to produce a sharp pulse across the load of either positive or negative polarity. FIGS. 22A and 22B show the operation of the reconfigurable transmitter 1500 in more detail. Referring to FIG. 22A, in the first of a bit '0' period, transistors 1502 and 1504 are turned on and transistors 1506 and 1508 are turned off to drive a current through the antenna load. Referring to FIG. 22B, in the second half of the period, the antenna is short circuited to ground via transistors 1506 and 1504. This simple H-bridge circuit is compatible with low cost technologies such as CMOS and the control signals for circuit are easily generated with digital logic.

This H-bridge can be reconfigured as a narrowband transmitter by driving the structure with the period LO signal which can be frequency modulated in high efficiency mode or even driven as a linear differential amplifier for standards that require power amplifier (PA) linearity. Each switching transistor can be biased in class A, A/B, C, D, or E, E/F modes of operation to achieve the required linearity/efficiency tradeoff. In class D mode, for instance, the load is alternated in polarity between the supply and ground, which results in maximum radiated power given by the power supply and the antenna impedance. Power control can be introduced by regulating the supply of the circuit or by employing impedance matching.

VIII. Kits

Further provided herein are kits comprising devices of the present invention. In one embodiment, an asymmetric wireless system as described herein can be sold to end users in the form of a kit. The kits can comprise multiple items, including but not limited to integrated devices comprising one or more anchor, or base, node devices and one or more peripheral node devices. The devices can implement multiple radio communications. In some embodiments, a peripheral node device is in the form of a patch. In some embodiments, a kit can provide a system comprising multiple peripheral node devices and one or more anchor node devices. In some embodiments, the nodular devices use integrated Application-specific integrated circuit (ASIC) implementations for robust and cost effective communications. The devices can further comprise dual mode reconfigurable transceivers as described herein. In some embodiments, the kit can include a host device with an integrated wireless base. In another embodiment, the kit provides one or more peripheral node patch devices. These devices may be disposable. Such a kit can be useful when the end user, e.g., a hospital, has already purchased a kit comprising an anchor node and needs to replenish the supply of disposable patch devices that communicate with the anchor.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of switching radio connections in a communication system, comprising:

providing a peripheral node comprising a first set of radios for transmitting and receiving signals, wherein the first set of radios of comprises a plurality of radios having complementary characteristics and different structures;

providing a base node comprising (1) a second set of radios for transmitting and receiving signals, wherein the second set of radios comprises a plurality of radios having complementary characteristics and different structures, wherein the peripheral node and the base node are constructed and arranged to wirelessly connect via both the first set of radios and the second set of radios, and (2) a controller configured to assess a quality of a wireless connection and send commands to the plurality of radios in the first set of radios and the second set of radios to activate or deactivate in real time based on the quality assessment;

activating the wireless connection between the base node and the peripheral node by selecting a first radio from the first set of radios and a first radio from the second set of radios to form a forward radio connection that transmits data from the peripheral node to the base node;

forming a reverse radio connection that transmits data from the base node to the peripheral node using a selected radio from the first set of radios and a selected radio from the second set of radios; and switching to a second radio from the first set of radios and a second radio from the second set of radios to maintain the forward radio connection during the wireless connection, in response to the commands from the controller provided through the reverse radio connection.

2. The method of claim 1 wherein the plurality of radios in the first set of radios or the second set of radios have different receiver sensitivity, spectrum usage, permissible radiated power, and inherent interference mitigation.

3. The method of claim 1 wherein the plurality of radios in the first set of radios or the second set of radios have different fading characteristics.

4. The method of claim 1 wherein the first radio from the first set of radios or the first radio from the second set of radios is randomly selected.

5. The method of claim 1 wherein the first radio from the first set of radios or the first radio from the second set of radios is determined by a user or factory configuration.

6. The method of claim 1 wherein a power spectral density of the plurality of radios of the second set of radios is measured, thereby predicting an amount of interference experienced by each of the radios of the second set of radios.

7. The method of claim 6 wherein the first radio from the second set of radios is selected based on the predicted amount of interference.

8. The method of claim 1 wherein the step of switching to another radio is repeated until the peripheral node transmits data to the base node via the forward radio connection within a predetermined time interval.

9. The method of claim 8 wherein the base node listens on the forward radio connection until the peripheral node transmits data to the second node via the forward radio connection within the predetermined time interval.

10. The method of claim 1 wherein the peripheral node is provided on a patch attached to a person's body.

11. The method of claim 10 wherein the patch collects physiological data of the person from at least one body sensor attached to the patch.

12. The method of claim 1 wherein the peripheral node comprises an on-board power source and operates at sufficiently low power to continuously operate from the power source for several days.

13. A communication system, comprising:
a peripheral node comprising a first set of radios for transmitting and receiving signals, wherein the first set of radios of comprises a plurality of radios having complementary characteristics and different structures; and
a base node comprising (1) a second set of radios for transmitting and receiving signals, wherein the second set of radios comprises a plurality of radios having complementary characteristics and different structures, wherein the peripheral node and the base node are constructed and arranged to wirelessly connect via both the first set of radios and the second set of radios, and (2) a controller configured to assess a quality of a wireless connection and send commands to the plurality of radios in the first set of radios and the second set of radios to activate or deactivate in real time based on the quality assessment;
wherein the peripheral node and the base node are constructed and arranged to (1) activate the wireless connection between the base node and the peripheral node by selecting a first radio from the first set of radios and a first radio from the second set of radios to form a forward radio connection that transmits data from the peripheral node to the base node, (2) form a reverse radio connection that transmits data from the base node to the peripheral node using a selected radio from the first set of radios and a selected radio from the second set of radios, and (3) switch to a second radio from the first set of radios and a second radio from the second set of radios to maintain the forward radio connection during the wireless connection, in response to the commands from the controller provided through the reverse radio connection.

14. The system of claim 13 wherein at least one radio of the second set of radios uses a multiple antenna scheme and at least one corresponding radio of the first set of radios uses a single antenna scheme.

15. A method of using radio connections in a communication system, comprising:
providing a peripheral node comprising a first set of radios for transmitting and receiving signals, wherein the first set of radios of comprises a plurality of radios having complementary characteristics and different structures;
providing a base node comprising (1) a second set of radios for transmitting and receiving signals, wherein the second set of radios comprises a plurality of radios having complementary characteristics and different structures, wherein the peripheral node and the base node are constructed and arranged to wirelessly connect via both the first set of radios and the second set of radios, and (2) a controller configured to assess a quality of a wireless connection and send commands to the plurality of radios in the first set of radios and the second set of radios to activate or deactivate in real time based on the quality assessment;
simultaneously transmitting, from the plurality of radios of the first set of radios to the plurality of radios of the second set of radios; and
combining signals from the plurality of radios of the second set of radios.

16. The method of claim 15 wherein the plurality of radios in the first set of radios or the second set of radios having complementary characteristics and different structures use a same symbol constellation alphabet for encoding data.

17. The method of claim 15 wherein the signals from the plurality of radios in the second set of radios are combined in baseband.

18. The method of claim 17 wherein base signals from the plurality of radios are summed together immediately prior to slicing and the summed signal is sent to a single slicer.

19. The method of claim 15 wherein the signals from the plurality of radios in the second set of radios are combined with aid of a radio receiver comprising a plurality of finger sub-receivers, wherein each finger sub-receiver independently decodes a single multipath component, which is later combined with other multipath components.

20. The method of claim 15 wherein the peripheral node is provided on a patch attached to a person's body, wherein the patch collects physiological data from at least one body sensor attached to the patch.

* * * * *